United States Patent
Singh

(10) Patent No.: US 10,326,830 B1
(45) Date of Patent: Jun. 18, 2019

(54) MULTIPATH TUNNELING TO A SERVICE OFFERED AT SEVERAL DATACENTERS

(71) Applicant: Amazon Technologies, Inc., Seattle, WA (US)

(72) Inventor: Bijendra Singh, Cedar Park, TX (US)

(73) Assignee: Amazon Technologies, Inc., Seattle, WA (US)

(*) Notice: Subject to any disclaimer, the term of this patent is extended or adjusted under 35 U.S.C. 154(b) by 265 days.

(21) Appl. No.: 15/256,304

(22) Filed: Sep. 2, 2016

(51) Int. Cl.
| | |
|---|---|
| *G06F 15/16* | (2006.01) |
| *H04L 29/08* | (2006.01) |
| *H04L 12/46* | (2006.01) |
| *H04L 12/24* | (2006.01) |

(52) U.S. Cl.
CPC ...... *H04L 67/1004* (2013.01); *H04L 12/4633* (2013.01); *H04L 41/0813* (2013.01)

(58) Field of Classification Search
CPC ............. H04L 67/1004; H04L 12/4633; H04L 41/0813
USPC ........................................................ 709/223
See application file for complete search history.

(56) References Cited

U.S. PATENT DOCUMENTS

| | | | | |
|---|---|---|---|---|
| 9,550,836 B2* | 1/2017 | Smith | ..................... | C07K 16/40 |
| 9,699,001 B2* | 7/2017 | Addanki | ............... | H04L 12/465 |
| 2011/0026403 A1* | 2/2011 | Shao | .................... | H04L 67/2895 370/235 |
| 2013/0014101 A1* | 1/2013 | Ballani | ................. | H04L 67/101 718/1 |
| 2014/0136690 A1* | 5/2014 | Jain | ..................... | H04L 41/5012 709/224 |
| 2014/0362859 A1* | 12/2014 | Addanki | ............... | H04L 12/465 370/392 |
| 2017/0353351 A1* | 12/2017 | Cheng | ................. | H04L 12/4641 |

\* cited by examiner

*Primary Examiner* — Sm A Rahman
(74) *Attorney, Agent, or Firm* — Kilpatrick Townsend & Stockton LLP

(57) ABSTRACT

Techniques are disclosed herein regarding interfaces and multipath groups each associated with some of the interfaces to a datacenter. The techniques can include forwarding a network packet to be processed by a service, the service offered on each datacenter such that the network packet can be processed interchangeably at each datacenter. The techniques can also include, selecting one of the multipath groups for outputting of the network packet to the datacenter corresponding to the selected multipath group for processing by the service, the selecting based upon a cost to process the network packet at a respective one of the datacenters corresponding to each of the multipath groups. The techniques can further include, upon determining that the selected multipath group corresponds to a datacenter with an intervening second domain between the device and the corresponding datacenter, encapsulating the network packet for tunneling the network packet through the second domain.

30 Claims, 12 Drawing Sheets

MULTIPATH TUNNELING TO A SERVICE OFFERED AT SEVERAL DATACENTERS

BACKGROUND

A service, such as a social media service, can be offered concurrently on several different datacenters. The service can be used to process network packets that may be received by any of the different datacenters. For example, a user's request to update his/her social status on a social network service could be performed by any one of several different datacenters. The datacenters can be geographically remote from each other. Different network domains may separate domain(s) of the datacenters offering a service. Selection of which datacenter to process a network packet by a service can impact network security, service response times, or other performance metrics associated with a service offered on several different datacenters. Thus, there is need for improvement in the field of techniques to route packets to be processed by a service.

BRIEF DESCRIPTION OF THE DRAWINGS

Various embodiments in accordance with the present disclosure will be described with reference to the drawings, in which.

DETAILED DESCRIPTION

Figure 1:
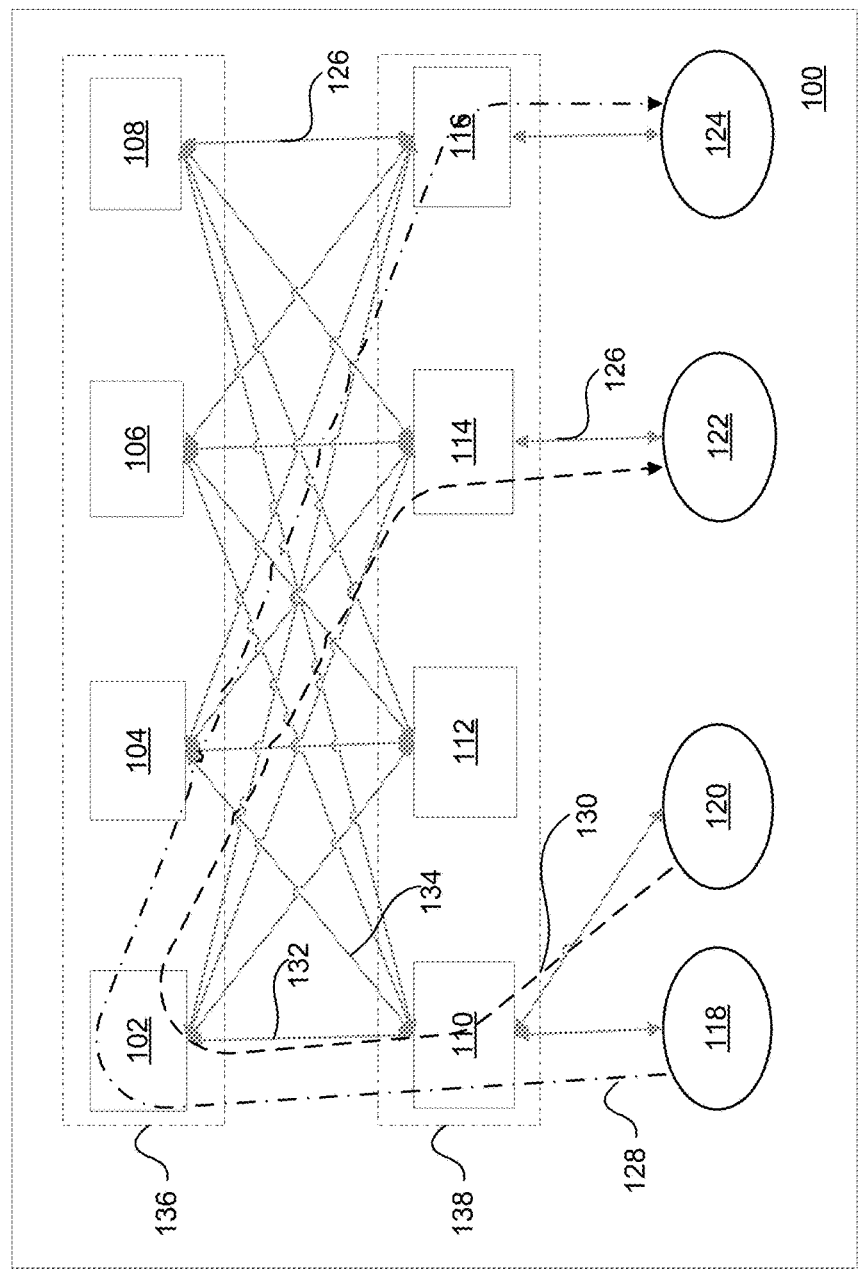
FIG. 1 illustrates a datacenter infrastructure according to certain embodiments.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiments being described.

A network device, such as a router, can receive a network packet. Based on information contained within the network packet (such as a destination IP address, a port number, etc.), a determination can be made by the network device that the network packet is to be processed by a service. A service, as used herein, refers to functionality provided by a plurality of computer devices that can each be used interchangeably. For example, any one of a plurality of computer devices can process data according to the service if all of the computer devices offer the same service. The service can utilize a mechanism to enable access to one or more capabilities, where the access is provided using a prescribed interface and can be exercised consistent with common constraints and policies. As used herein, the terms "offered" or "available" when referenced to a service means that a computer device provides functionality of the service.

Some services can be offered by several datacenters. A datacenter can be a group of networked computer devices that can be used to store, process, and/or distribute relatively large amounts of data. A service be offered using one or more processors, memories, modules, instructions (e.g., instructions implemented on non-transitory memory), logic, or other computer resources. When a determination is made by a network device that a network packet is to be forwarded for processing by a service, a determination can also be made as to what computer device the network packet should be forwarded to for processing by the service. A network device can include several egress interfaces. An egress interface can indicate a path by which a network packet leaves a network device. Each egress interface can be associated with a different network device.

In order to provide for additional bandwidth between devices, a plurality of egress interfaces can be designated between two devices. In order to reduce processing overheads regarding selection and management of these interfaces, several egress interfaces associated with a single external device can be grouped into a multipath group. Thus, when forwarding packets to a computer device, a network device can select a multipath group instead of a single interface, as each interface of a multipath group can lead to the same computer device. Thus, a network device can designate a multipath group as leading to a respective network device and/or datacenter that offers a service.

Selection of an appropriate egress interface or multipath group can be accomplished in a variety of manners. For example, an egress interface can be randomly selected to attempt to distribute network packets determined for processing by a service relatively uniformly across network devices that offer the service. However, as datacenters and computer devices are becoming more globalized, such a distribution schema may lead to uneven loading of computer devices offering the services as some delays may be introduced by physical separation of computer device(s) and/or network topologies, for example.

Disclosed herein are techniques for determining costs associated with forwarding of network packets for processing by a service shared by computer devices. The techniques can intelligently select an appropriate computer device for processing of a network packet by, for example, selecting one of several devices offering a service capable of processing the network packet based on a cost of processing the network packet at each of the devices. In certain embodiments, cost information can aid in selecting computer devices to more efficiently load balance processing capabilities of the computer devices offering a service and/or to select a certain device having a lowest associated cost to process a network packet.

In certain embodiments, a datacenter can offer a service. Computer devices of the datacenter can share a network domain. As used herein, a domain can be a distinct subset of a network with addresses sharing a common suffix or under the control of a particular organization or individual. A network domain can, for example, be associated with a certain layer of the Open System Interconnection (OSI) framework. For example, a network domain can include one or more network devices that include destination addresses or other information for forwarding of network packet between them. A network domain can be private or public. A private network domain may not be discoverable by devices that are not designated as being part of the private network domain (e.g., they may not advertise access addresses, keys, or other information for access to a device that is a member of the private network). A public network domain can include devices that advertise such information.

A datacenter may include computer devices that share a private network domain. However, several datacenters may each be on a different private network domain or a shared private network domain that is physically isolated by other network domains. For example, the internet may be used to transfer packets between different datacenters. A border router, as used herein, can be a network router that is deployed in front of a private network domain's main firewalls and can perform some basic checks on network activity, such as ingress and egress filtering. A border router can, for example, receive a network packet and determine that the network packet is to be processed by a service by examining an IP address, port number, or other information of the network packet (e.g., in an IP header of the network packet). The border router can then determine, as disclosed herein, if the network packet is to be processed by a local datacenter or a remote datacenter. If the network packet is to be processed by a local datacenter, the border router can forward the packet to a computer device of the datacenter. If, however, the packet is to be processed by a remote datacenter wherein a network domain must be traversed to reach the remote datacenter, the border router can encapsulate the network packet to tunnel the network packet to the remote datacenter. Tunneling, as used herein, can include transmission of network packets intended for use only within a private domain through another domain in such a way that routing nodes in the other domain are unaware that the transmission is part of the private domain.

FIG. 1 illustrates a network infrastructure 100 (which can be a private network domain) according to certain embodiments. Network infrastructure 100 includes various network devices, 102-116. Network devices 102-116 can be configured to route network packets transferred between devices 118, 120, 122, and 124. Any of computer devices 118, 120, 122, and 124 can represent host or client side devices (e.g., packets can flow in any direction between the computer devices). Note that computer device 118, 120, 122, and/or 124 can include network interface capabilities for transfer and/or reception of network packets. Various paths 126 are illustrated as connecting the network devices 102-116 and computer devices 118-124.

In network infrastructure 100, network device 110 interfaces to each of network devices 102, 104, 106, and 108. Likewise, each of network devices 112, 114, and 116 interfaces to each of network devices 102, 104, 106, and 108. Thus, network packets can flow directly between any of network devices 102, 104, 106, or 108 to any of network devices 110, 112, 114, or 116. Flow of network packets 128 is illustrated as traversing network infrastructure 100 via path 118-110-102-116-124. Flow of network packets 130 is illustrated as traversing network infrastructure 100 via path 120-110-102-114-122.

When network device 110 receives a network packet from network device 120, it can route the network packet based on information contained within the network packet (such as a source and/or destination address. For example, the destination of a network packet of flow 130 can indicate that the final destination is computer device 124. Using this information, network device 110 can make a determination that the network packet is to be output to network device 102 as the most efficient next hop destination along its path to ready computer device 124. This determination can be made using various techniques of a network device, as disclosed herein. Furthermore, various techniques can be used to determine optimal paths between network devices for network packets to flow through. These techniques can be dynamic and respond to various network conditions.

In certain embodiments, network infrastructure 100 can be a leaf/spine datacenter network infrastructure. Network devices 102, 104, 106, and 108 can be referred to as a spine layer 136 within network infrastructure 100. Network devices 110, 112, 114, and 116 can be referred to as a leaf layer 138 within network infrastructure. Network infrastructure 100 can be configured such that an equal cost (e.g., with regards to latency) path exists between any two devices of computer devices 118, 120, 122, and 124. In such a topology, paths 126 (including 132 and 134) can represent physical links between network devices within network infrastructure 100.

In certain embodiments, as new host or client devices are added to network infrastructure 100, a new physical link can be connected between the host or client device and a network device of the leaf layer 138. Furthermore, each network device in the spine layer 136 can be organized into panes (e.g., groups of network devices or ports of network devices) within the spine layer 136. Each network device within a pane of spine layer 136 can be associated with one of a group of network devices within leaf layer 138. These example topologies can be used to simplify discovery and formation of multipath groups within network infrastructure 100, enabling network infrastructure 100 to be easily scalable within a datacenter infrastructure environment. Scalability can aid in adapting network infrastructure 100 to accommodate more computing resources (devices 118, 120, 122, or 124) or more intranetwork communication infrastructure (network devices 102-116). The topology of network infrastructure 100 can enable a datacenter infrastructure wherein each device 118-124 can communicate with relatively equal latency any other device 118-124. Multipath groups of network devices within leaf layer 138 can be associated with a pane of network devices within spine layer 136 or network devices within spine layer 136.

Although not illustrated, a border router can be included within network infrastructure 100. A border router can be physically connected to one or more of network devices 102, 104, 106, or 108 (i.e., the spine layer 136). A border router can forward a packet to one of these network devices to, for example, be processed by a service available on one of computer devices 118, 120, 122, or 124.

Figure 2:
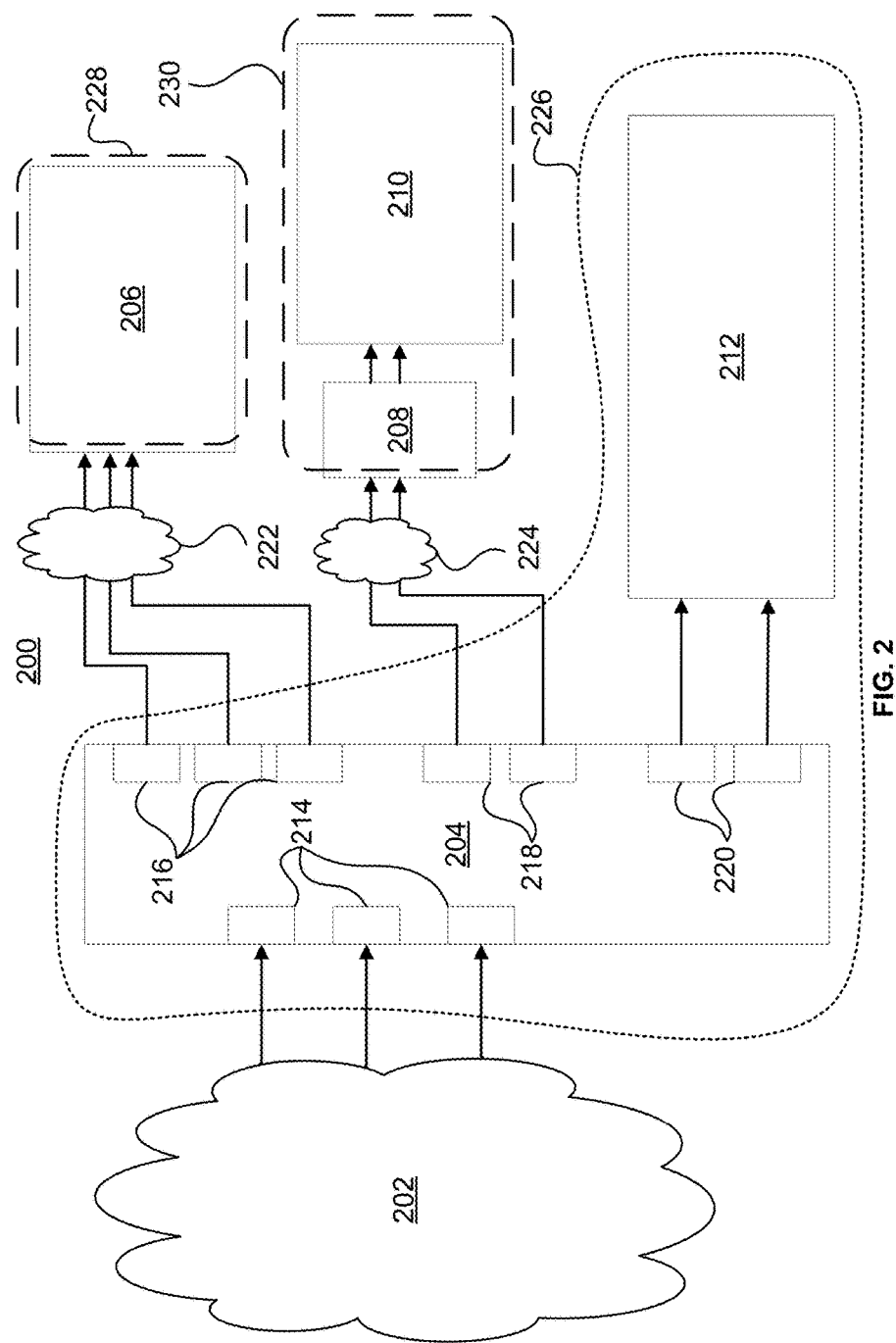
FIG. 2 illustrates a network infrastructure including datacenters according to certain embodiments.

FIG. 2 illustrates a system including several different network domains. Illustrates is a border router 204. Border router 204 can receive one or more network packets from network domain 202. Network domain 202 can, for example, be a public network domain or operate on a different network domain from border router 204. Network domain 202 can represent the internet. Network packets received by border router 204 can be determined to be processed by a service that can be offered on datacenters 206, 210, and 212, for example. For example, each of datacenter 206, 210, and 212 can offer a service associated with social media and can each interchangeably process a request for the service to process one or more network packets.

Network packets can be received by border router 204 from network domain 202, at one or more of ingress interfaces 214, for example. Using routing logic described herein, border router 204 can determine that a network packet is to be processed by a service offered at datacenter 206, 210, and 212. Each of datacenters 206, 210, or 212 can correspond to a datacenter represented by network infrastructures 100, for example. Border router 204 can select one of multipath groups 216, 218, or 220 to forward the network packet to one of datacenters 206, 210, or 212 respectively. In certain embodiments, multipath group 216 can be associated with a first plurality of interfaces (as illustrated), multipath group 218 can be associated with a second plurality of interfaces, and multipath group 220 can be associated with a third plurality of interfaces. Each of the multipath groups 216, 218, and 220 can correspond to one of datacenters 206, 210, and 212 respectively. Thus, by selecting one of a plurality of multipath groups, via routing logic of border router 204, one of multipath groups 216, 218, or 220 can be selected.

Domain 226 illustrates a network domain that can be shared by border router 204 and datacenter 212. Thus, datacenter 212 can be considered local to border router 204. Datacenter 206 can be implemented within a network domain 228. The network domain 228 of datacenter 206 can be a part of domain 226, but may be physically separated by a public or other private network domains 222. Border router 204 can encapsulate network packets transmitted via multipath group 216 to datacenter 206 to traverse network domain 222 to be processed by a service offered on datacenter 206. Network packets transmitted via multipath group 220 may not be encapsulated when forwarded to datacenter 212 for processing by the service, as no network domain needs be traversed. Datacenter 210 and/or router 208 may also share a network domain 230. Network domain 230 can be a part of network domains 226 and 228. For datacenter 210, router 208 is an optional border router included to illustrate that a remote datacenter from border router 204 may include or be coupled to a respective border router different from border router 204. Similar to forwarding of network packets to datacenter 206, network packets forwarded to border router 208 via multipath group 218 can be encapsulated and tunneled across network domain 224. Border router 208 can de-encapsulate such packets before forwarding to datacenter 210 (such as to a device operating on a spline layer of datacenter 210).

Although not specifically illustrated, datacenters 206, 210, and/or 212 can be geographically remote from one another. Thus, packets forwarded via multipath group 216 can have a different associated cost before being processed by a service as compared to network packets forwarded via multipath group 220 to be processed at datacenter 212 by the service. Costs can be associated with, for example, latencies that arise from traversing network domains 222 or 224, bandwidth of network paths coupling border router 204 and each of datacenters 206, 210, or 212, a current bandwidth available on each of the paths (e.g., an amount or percentage of a total bandwidth that is currently not in use, the total bandwidth defined by hardware or other interfaces between two or more devices), a monetary cost to process network packets at datacenters 206, 210, or 212, or a combination of the preceding. In certain embodiments, border router 204 can select one from a plurality of multipath groups to minimize a cost for processing of a specific network packet by a service offered by datacenters 206, 210, and 212. The cost can include times to traverse network domain(s) between border router 204 and datacenters (such as domains 222 or 224) and/or times to process the network packets at one of the datacenters 206, 210, or 212. In certain embodiments, as will be further described, a multipath group (and respective datacenter) can be selected to improve load balancing across datacenters (such as datacenters 206, 210, and 212).

In certain embodiments, multipath groups (such as multipath groups 216, 218, and/or 220) are not needed to implement disclosed functionality. For example, border router 204 can forward received network packets to datacenter 212 via a single egress interface (or egress port). Thus, although multipath group 220 is illustrated as including two egress interfaces, only a single egress interface may couple border router 204 to datacenter 212 (or any other datacenter). The single interface may or may not be associated with a multipath group (the multipath group including one interface).

Figure 3:
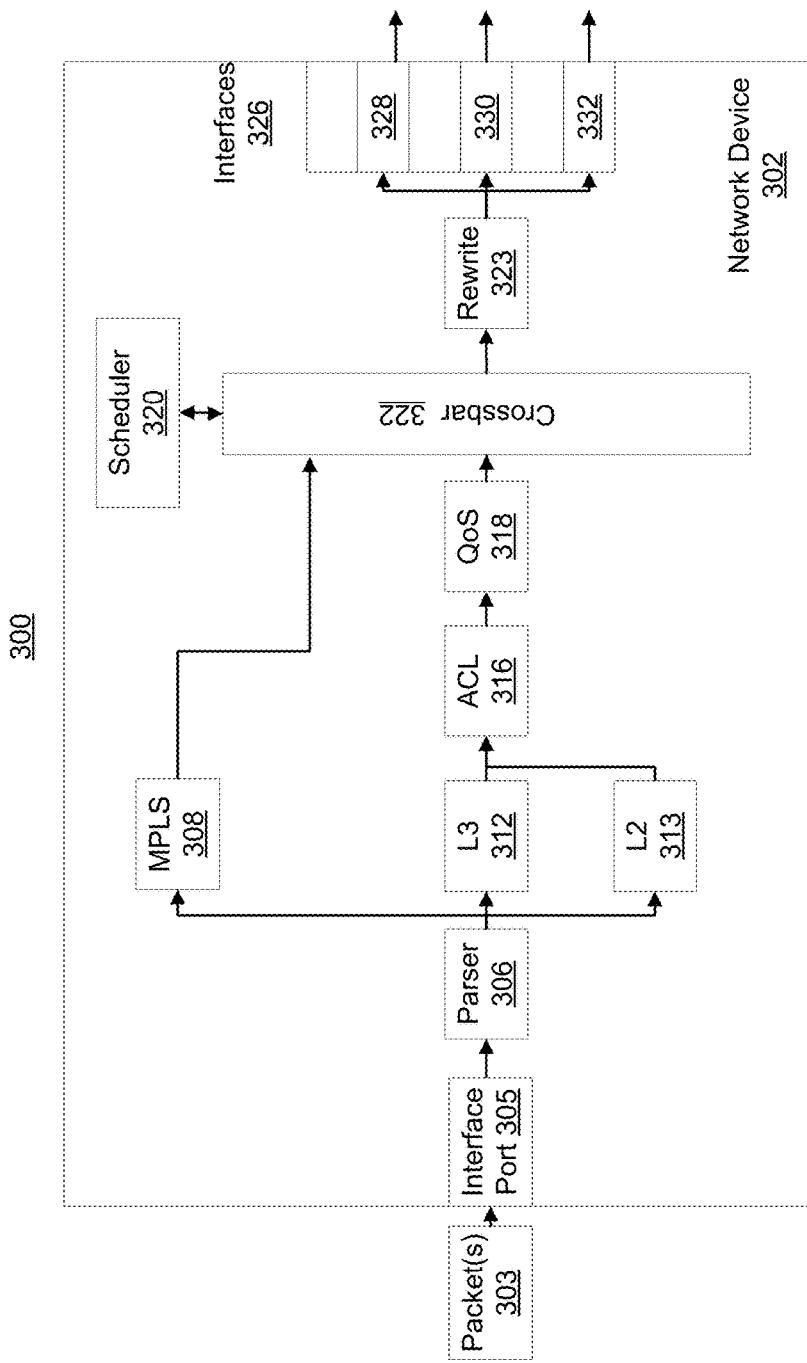
FIG. 3 illustrates a routing pipeline of a network device according to certain embodiments.

FIG. 3 illustrates a logical block diagram 300 illustrating techniques for processing and forwarding of network packets. The techniques of diagram 300 can be implemented by a packet processor of border router 204, for example. The packet processor can also be implemented using pipelined operations to support packet processing speeds for high-speed network data transfer operations, including forwarding information lookups and other packet processing operations. The packet processor can be implemented to provide forwarding of network packets as part of the data plane so that forwarding may be performed without software-based techniques.

Network packet(s) 304 can be received via a network interface, such via interface port 305. Interface port 305 can provide a physical layer (PHY) interface. Media Access Control (MAC) layer interface that can be implemented via interface port 305. Network packet(s) 304 can be analyzed to detect valid flows and segment the flow into datagrams (e.g., packets/frames). For instance, the PHY layer may receive and transmit data across physical connections (e.g., such as electrical signals received over twisted-pair coaxial cable or optical signals received over optical fiber). The PHY layer may implement different techniques dependent on the speed or type of network interface configuration (e.g., ethernet 10 base-T, 100 base-TX, and 100 base-T forms), such as encoding, multiplexing, synchronization, clock recovery, and/or data serialization. Various signaling standards, such as IEEE 802.3, may govern the performance of the PHY layer consistent with the open systems interconnection (OSI) model for communications. The MAC layer may delimit frames and packets from the flow of data. Error checking may also be implemented at the MAC layer, checking for different errors, such as frame check sequence (FCS), interframe gap enforcement, and frame preambles.

Packet parser 306 can receive network packets and separate the packet header from the packet payload. Packet parser 306 can parse the packet header to determine and/or extract data for making forwarding decisions for the packet. For example, packet parser 304 can extract different layer headers (e.g., L2 and L3 headers) included in an Internet protocol (IP) version 3 packet, such as the source MAC address, the destination MAC address, the source IP address, the destination IP address, and port numbers. Using information from the layer headers, the network packets can be forwarded to Multiprotocol Label Switching (MPLS) module 308, Level 3 (L3) routing module 312, or Level 2 (L2) routing module 314. MPLS module 308 can use MPLS techniques to make forwarding decisions based on information in the header, bypassing Open System Interconnection (OSI) L2 and L3 routing decisions.

A network packet can be forwarded to L3 routing module 312 or L2 routing module 314 in order to determine forwarding and tunneling decisions based on information in the packet header (e.g., packet metadata) extracted by packet parser 306. For example, L3 routing module 312 can locate appropriate forwarding information through the use of Forwarding Table(s). Forwarding Table(s) can, in certain embodiments, be logically partitioned within L3 routing module 312. In certain embodiments, information can be organized and located in elements of Forwarding Table(s). L2 routing module 314 can perform lookups for data in layer 2 (L2) portions of the packet to perform L2 forwarding. L2 forwarding may access a MAC address table in forwarding tables (not shown) to perform two lookups (which may be in parallel or in series). These forwarding tables can also benefit from features of the disclosure. The first lookup may be performed with a key extracted from the packet header at packet parser 306 (e.g., a VLAN and source MAC address), to determine whether an entry for the packet is present in Forwarding Table(s). If the source MAC address is unknown, then a mapping determination may be made to map the source MAC address to a port identified in the packet header. If the MAC address is known but attached to a different port than indicated the MAC address table, than an operation may be performed to move the source MAC address to the port identified in the packet header. Otherwise, the MAC address is known in the MAC address table. Another look up to the MAC address table may also be performed at another key (the VLAN in the destination MAC address). The network packet may be routed if the MAC address table contains an entry for the destination MAC address owned by a network device (otherwise other operations may be performed, such as trapping the network packet for the CPU, bridging the packet out of a listing interface, or flooded out of all ports and an STP forwarding state).

L3 routing module 312 can perform lookups for data in layer 3 (L3) portions of the packet to perform L3 forwarding. For example, IP headers for the packet may be evaluated respect to entries and tables such as a routing or next top table, to determine forwarding to be performed. The previous examples of packet forwarding is not exhaustive, as many other forwarding systems may be made, including, but not limited to, forwarding for spanning tree protocol (STP) state checking, access port VLAN handling, VLAN membership checking, MAC2ME lookup, broadcast/multicast forwarding to a host CPU for the switch, tunnel start/ termination lookup, longest prefix match, source MAC lookup, learn filtering, learn requests, moved source MAC checking, multiprotocol label switching (MPLS) label lookups, traffic class mapping, time-to-live (TTL) checks, packet actions based on ingress/egress access control lists (ACL), and front/or various other destination resolution lookups. As packet forwarding make forwarding decisions about the packet, the decisions are maintained as packet metadata. The packet metadata can be provided to scheduler 320 for scheduling determinations.

Forwarding Table(s) may be implemented in one or multiple storage devices, such as various memory devices (e.g., a CAM, such as TCAM, and/or random access memory) to store table data for performing different routing decisions. Forwarding Table(s) may include a VLAN table, MAC address table, routing table, adjacency table, next top table, tunnel start table, virtual routing and forwarding identifier table, tunnel termination table, and/or actions table. Each of these different tables may be utilized to retrieve or determine packet forwarding decisions, tunneling decisions, and associated modifications that may need to be made to network packets.

Access Control List module 316 can, based on rules) compare information obtained from a network packet header or elsewhere to make a determination if the network packet header is allowed to be directed to specific destination(s). For example, Access Control List module 316 can include a list of source address(es) of network packets that are allowed to be forwarded to certain address(es). Access Control List module 316 can also include a list of source address(es) of network packets that are not allowed to be forwarded to certain address(es). Additional information can be included within Access Control List module 316 such as protocol version(s), identifying information, or other. After Access Control List module 316 determined whether a specific network packet is approved for forwarding, the network packet can be forwarded to Quality of Service module 318.

Quality of Service module 318 can, based on certain rules, prioritize forwarding of certain network packets over others. For example, certain rules can, based on a QoS policy, can specify that types of packets (such as those associated with video or voice over internet) take priority over other packets (such as for mass file transfers). As another example, a QoS policy can specify that certain users take priority over others. Quality of Service module 318 can withhold certain network packets from proceeding to Crossbar 322. Crossbar 322 can be a switch controlling multiple inputs and multiple outputs. Quality of Service module 318 can comprise multiple queues of output data, each having a different priority. The multiple inputs can each be associated with MPLS module 308, QoS module 318, or other. The multiple outputs can each be associated with an outgoing interface port of Interfaces 326. Illustrated are three example routings of data to interface 328, interface 330, and interface 332 respectively before proceeding to a network device external to network device 302.

Scheduler 320 can control the buffering of packets and scheduling of operations within the network device 302 For example, scheduler 320 can implement a memory management unit to allocate available memory segments for buffering stored packets. Scheduler 320 can also implement a memory management unit to allocate packets from a buffer for final processing and egress. Scheduler 320 can provide the appropriate metadata for a packet. Once a packet has been scheduled, Scheduler 320 can utilize Crossbar 322 and, PHY interface, and/or a MAC layer interface to transmit network packets as network data. Rewrite module 324 can be used to rewrite encapsulation or other information after a packet has traversed crossbar 322, for example. The rewrite module can rewrite encapsulation information to, for example, enable tunneling in the packet, enforce ACL, or appending a next-hop address.

Figure 4:
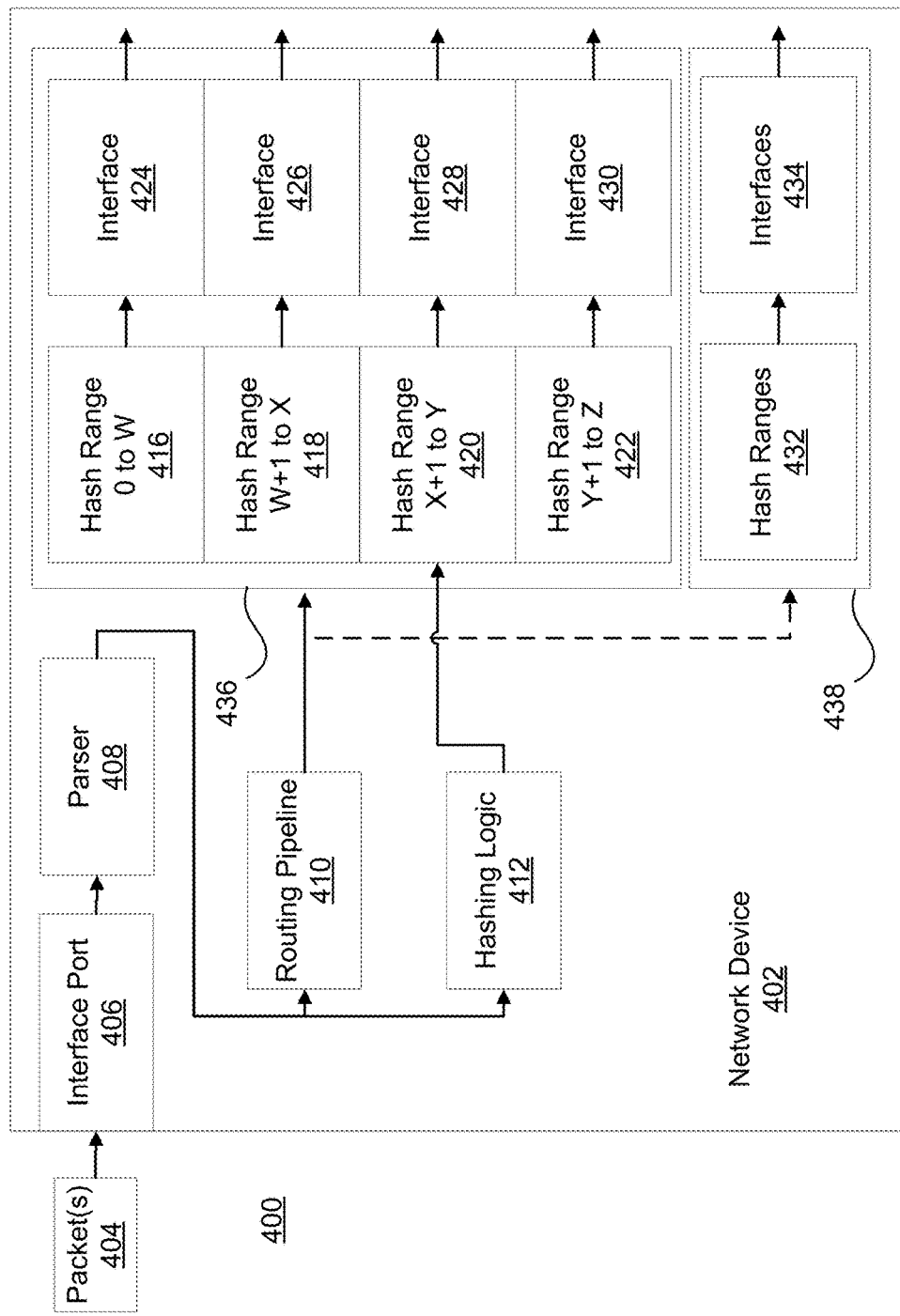
FIG. 4 illustrates a network device including multipath groups according to certain embodiments.

FIG. 4 illustrates a logical diagram of a network device 402 according to certain embodiments. Network device 402 can be similar to network device 302. Network device 402 can be a part of a network infrastructure 400. Network device 402 can receive network packet(s) 404 from other network devices (not shown) of network infrastructure 400. Network packet(s) 404 can be received at input interface 406. Network packets 404 can then proceed to parser 408.

Parser 408 can parse network packet(s) 404 to obtain information for routing of network packet(s) 404. For example, parser 408 can obtain destination, VLAN, MAC, source and/or destination IP address, or other information that can be parsed in order to determine, by network device 402, a destination address to route network packet(s) 404. Routing pipeline module 410 can proceed to process network packet(s) 404.

Routing Pipeline 410 can extract and use packet information from network packet(s) 404 to, for example, select a multipath group, next-hop, or other group for routing of network packet(s) 404. A specific group can be selected from a plurality of groups by information determined by routing pipeline 410. Routing pipeline 410 can include, for example, hash or other functionality to generate a group identifier and an egress path. Items 408-438 can provide functionality to route network packets to a specific egress interface of a multipath group.

Routing Pipeline 410 is illustrated as selecting multipath group 436 as a destination for packet(s) 404. Also illustrated is another multipath group 438 that could alternatively be selected by routine pipeline 410. Each of multipath groups 436 and 438 includes hash reference ranges 416-422 and 432 respectively. Each Hash reference range is associated with a respective corresponding interface 424-430 and 434. Hashing logic 412 can generate hash value(s) using information parsed from network packet(s) 404 by parser unit 408. These hash value(s) can enable a certain interface to be selected within a specific multipath group. For example, one of hash reference ranges 416, 418, 420, or 422 can be located that generated hash value(s) fall within. For example, a hash value of 0x400 may be generated by hashing logic 412. Hash reference range 418 may have hash reference ranges of between 0x400 and 0x499, for example. Similarly hash reference range 416 may include hash ranges of between 0x000 and 0x199, for example. In this example, the hash value of 0x400 would fall within hash reference range 418 and not hash reference range 416.

Each of hash reference ranges 416, 418, 420, and 422 can correspond to an interface. For example, hash reference range 418 can correspond to interface 426. Each of interfaces 424, 426, 428, and 430 can indicate an interface port to output network packets. As used herein, the term "hash reference range" for an interface referenced in a multipath group means a range of values associated with an interface such that, if a hash value generated for a network packet falls within the hash reference range for the interface, that interface is selected for that network packet. Each of the interface ports indicated by an interface can be associated with a virtual output, or other, queue (i.e., each virtual output queue can store packets, each having a different hash value). A virtual output queue can also be shared by multiple multipath groups.

Figure 5:
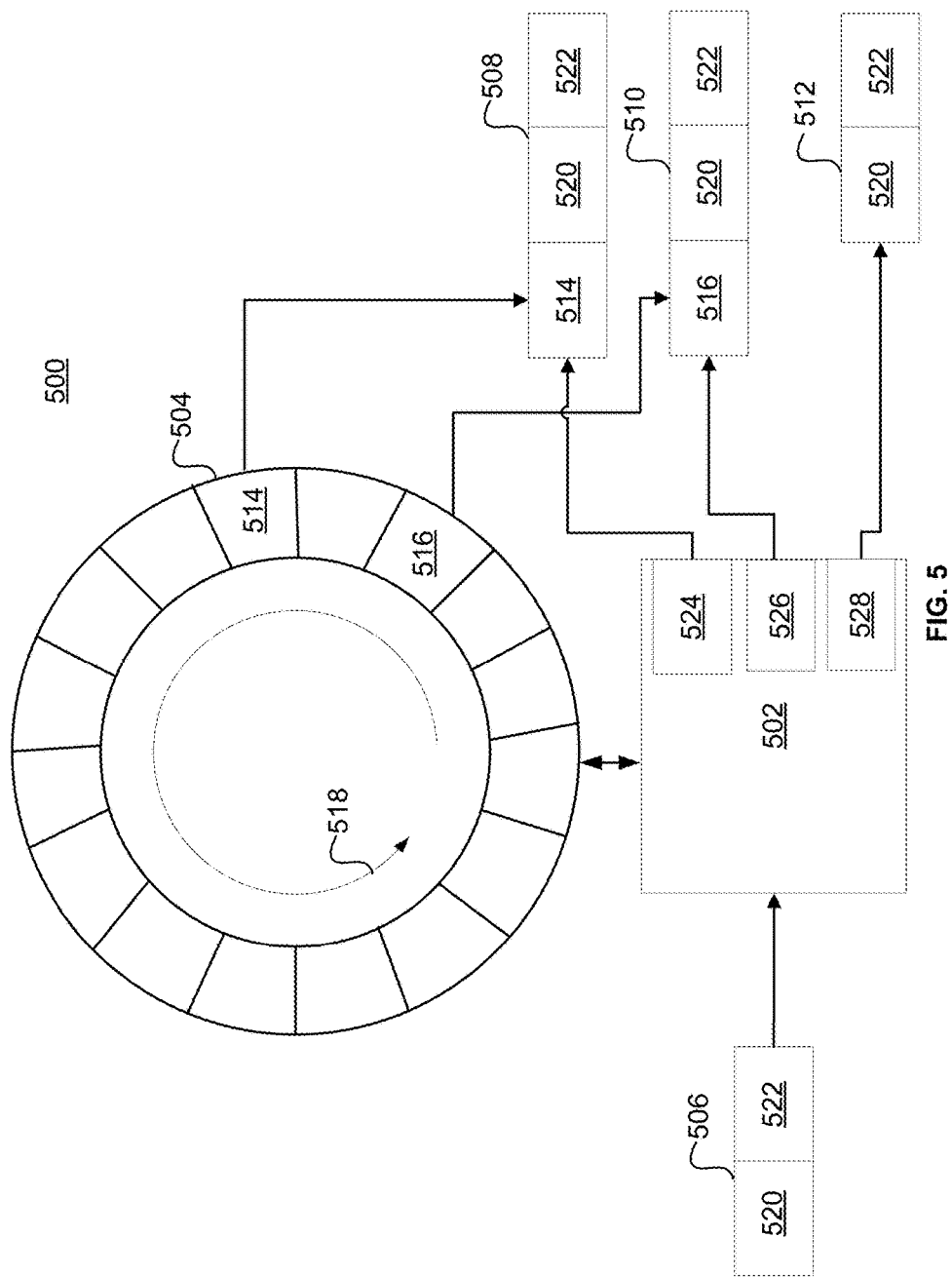
FIG. 5 illustrates a network device including a header buffer according to certain embodiments.

FIG. 5 illustrates a logical representation 500 of a network device that can include features of the disclosure. Illustrated is a border router 502 that can be similar to border router 204. Illustrates is a network packet 506 that includes a payload 522 and a header 520. Network packet 506 can be received at a port or interface of border router 502 and forwarded to one of a plurality of datacenters. For example, as illustrated in FIG. 2, network packet 506 can be forwarded to datacenter 206, datacenter 210, or datacenter 212. Also illustrated is a logical representation of a buffer 504 for storing headers. Buffer 504 is illustrated as a ring buffer and can, for example, store a plurality of headers, such as header 514 and header 516. Buffer 504 can be implemented via a First In, First Out (FIFO) protocol. A FIFO protocol is illustrated as being implemented via arrow 518. As one example, header 514 may be dropped from buffer 504 when a new header is added to buffer 504. Buffer 504 can be implemented within a memory of border router 502. Buffer 504 is illustrated as residing externally from border router 502 to better illustrate features of border router 502 and buffer 504, but buffer 504 can be implemented within memory of border router 502.

As disclosed herein, border router 502 can select one of a plurality of multipath groups 524, 526, and 528 for forwarding of network packet 506 to one of a plurality of datacenters (not shown). In certain embodiments, multipath group 524 can include one or more egress interfaces for forwarding of received network packet 506. Each of multipath groups 524, 526, and 528 can be associated with a header contained within buffer 504. For example, multipath group 524 can be associated with header 514. Multipath group 526 can be associated with header 516. Multipath group 528 may not be associated with a header of buffer 504. For example, multipath group 528 can be associated with local datacenter wherein tunneling is not needed to traverse a network domain to reach the local datacenter. Illustrated are three different optional network packets 508, 510, and 512 that can be forwarded to a respective datacenter (such as datacenters 206, 210, or 212).

If router logic of border router 502 selects a multipath group corresponding to a remote database (i.e., a network domain must be traversed in order to reach the remote database), then the routing logic can encapsulate the network packet to tunnel the network packet to a remote database. Illustrated are two network packets 508 and 510 that have been encapsulated for tunneling. As illustrated, network packet 508 includes an encapsulation (outer) header 514 in addition to header 520 (which can now become an inner header) and payload 522. Network packet 510 includes header 516 which encapsulates header 520 and payload 522. Headers 514 and 516 can be encapsulated via various techniques (such as IP-in-IP or Generic Routing Encapsulation (GRE), for example) in any combination, as disclosed herein. Network packet 512 is not illustrates as including a new header for encapsulation. This can indicate that network packet 512 is forwarded to a local database wherein tunneling is not required.

FIG. 5 also illustrates that headers (such as headers 514 and 516) can be copied from buffer 504 and appended to network packet 506 to encapsulate network packet 506 into network packets 508 or 510 respectively. As disclosed, each of network packets 508 and 510 can be used for tunneling to a respective remote datacenter via a respective multipath group. Buffer 504 can contain multiple entries that each corresponds to a multipath group (or a database) for tunneling of packets to a remote database.

The selection of a multipath group (such as multipath group 524, 526, or 518) can be accomplished using a variety of techniques. In certain embodiments, a hash range can be associated with a multipath group (and/or corresponding datacenter). In certain embodiments, routing logic of border router 502 can include a hash range used to select a multipath group. For example, routing logic can include a hash range (e.g., 0-1023) that corresponds to multipath groups associated with a specific service. The hash range can be apportioned between the multipath groups. For example, a first multipath group associated with a first datacenter of a service can be associated with a range 0-511 of the example hash range of 0-1023. A second multipath group can be associated with ranges 512-1023. A hash value can be generated for a network packet determined to be processed by service associated with the service. If the hash value falls within 0-511, in this example, the network packet can be forwarded via the first multipath group. Likewise, if the hash value falls within 512-1023, the network packet can be forwarded via the second multipath group. It should be understood that, for this example, only two multipath groups are associated with the hash range of 0-1023 and thus the range is evenly split between the two multipath groups. The hash range can likewise be split (evenly or unevenly) between multipath groups associated with a service.

In certain embodiments, the hash ranges and the assignment of the hash ranges between multipath groups can be updated as new datacenters are discovered and/or datacenters are dropped from a service (or lose connection to a border router). For example, a border router can lose connectivity to a datacenter and thus hash ranges can be redistributed among the remaining connected datacenters. Various other techniques can also be used including, for example, linked lists, tree techniques, etc. for selection of a multipath group associated with a service.

In certain embodiments, a service can be offered by computer device(s) located in a datacenter and specified by example IP address [x.y.z.k/p], wherein p can equal a route prefix used by a routing table of a network device. The same service can also be offered by computer device(s) having the same network address [x.y.z.k/p] in each of other datacenters. In each of the datacenters, the computer devices having network address [x.y.z.k/p] can be reachable via multipath groups of a network device (e.g., border router 204). For this example, the multipath groups are notated Group#N, with N connoting an associated one datacenter of a plurality of datacenters offering a service (corresponding to example IP address [x.y.z.k/p]). The costs of each multipath group can be:

1. Group#0 for reaching a first datacenter: Cost=P
2. Group#1 for reaching a second datacenter: Cost=P+ Cost of Datacenter#1
3. Group#2 for reaching a third datacenter: Cost=P+Cost of Datacenter#2
4. . . . .
5. Group#N for reaching corresponding datacenter: Cost=P+Cost of Datacenter#N, where P=a cost associated with routing and processing a network packet within a datacenter.

Note that P may or may not be equal for each datacenter. As disclosed herein, network packet transmissions times within a datacenter and/or processing time(s) can be different across datacenters and can be used to rank the datacenters. Also note that the first datacenter, for this example, is a local datacenter (e.g., datacenter 212 of FIG. 2) and therefore tunneling is not required to reach the first datacenter (thus, there is not a cost of datacenter 212 for Group#0 other than P). Also, a number of interfaces of each multipath group may or may not be equal.

In certain embodiments, a network device (such as border router 204) can generate an entity called Tunnel-Group (TG), which can be collection of member elements. The member elements can each correspond to a multipath group corresponding to a datacenter offering a service. A first member of a TG can be associated with a hash range of 0 to X1, where X1 can be number between 0 and a max-hash range. The first member can points to Group#0. The first member may not be associated with a header (such as a header of buffer 504). The second, third, and other members that may be associated with a remote datacenter may be associated with a header (such as a header of buffer 504) to encapsulate network packets for forwarding to a respective remote datacenter.

In certain embodiments, the multipath groups can be ranked according to certain properties. For example, a cost can be assigned to each multipath group (and/or datacenter) of a service. The cost can indicate a latency to transport network packets to a datacenter, bandwidth available of paths between a border router and a datacenter, bandwidth available on paths between a border router and a datacenter, a monetary cost to process network packets by a service at a datacenter, a current processing capability of a datacenter, or a combination of the preceding. For example, as disclosed herein, a packet may be tunneled to a remote datacenter. As a packet is tunneled (or otherwise forwarded without tunneling) a network domain may be traversed. The network domain to be traversed can include a number of network devices and/or physical network paths for transport of a network packet within. The latency and/or bandwidth cost to traverse such a domain can depend on many factors. For example, a physical length to traverse the domain, a number of network devices that are traversed, capabilities of the domain, a current loading of the domain, etc. Furthermore, a datacenter monetary cost can be determined by, for example, a current price of electricity at a datacenter, efficiencies of computer devices at the each datacenter, a maintenance cost to maintain each datacenter, or similar factors. These costs can be calculated by border router 502, for example, and used to rank multipath groups for a service. The ranking can include assigning higher ranks to those multipath groups (and/or datacenters) needing a lower latency to receive network packets from border router 502.

In certain embodiments, a cost of processing a network packet by a datacenter of a service can also or alternatively be used to rank multipath groups associated with the service. For example, a first datacenter may have more processing resources than a second datacenter of a service. If so, the first datacenter may be ranked higher relative to the second datacenter when considering processing costs. In certain embodiments, the processing cost can change as conditions change within a datacenter. For example, a certain datacenter may be heavily loaded due to an excess of processing requests and the datacenter or a certain resources of the datacenter being unavailable, for example. A datacenter's relative ranking can be adjusted depending upon such factors indicating a cost to process a network packet at a datacenter.

Various policies can be used to select a multipath group from a plurality of multipath groups associated with a service. For example, in certain embodiments, a highest ranked/lowest cost datacenter can always be selected for forwarding of a network packet to be processed by a service. In other embodiments, ranking, or other information, can be used to load balance between datacenters associated with a service. For example, if all network packets to be processed by a service are forwarded to only the lowest cost multipath group, the associated datacenter may become overburdened relative to the remaining datacenters. A border router can, instead, selectively forward packets across multipath groups to more evenly distribute loading across the datacenters and more efficiently use service resources as a whole. For example, a border router can forward a greatest portion of network packets to a highest ranked datacenter, a second greatest portion to a second highest ranked datacenter, and so on. Cost information associated with transporting network packets and processing can be considered in any combination in order to adjust load balancing parameters. In certain embodiments, some networked priorities can be determined to be relatively compute heavy and require relatively low cost. As such, a multipath group can be selected associated with a datacenter determined to have relatively greater processing resources even though the datacenter may be associated with a higher cost for transporting of packets to the datacenter.

Figure 6:
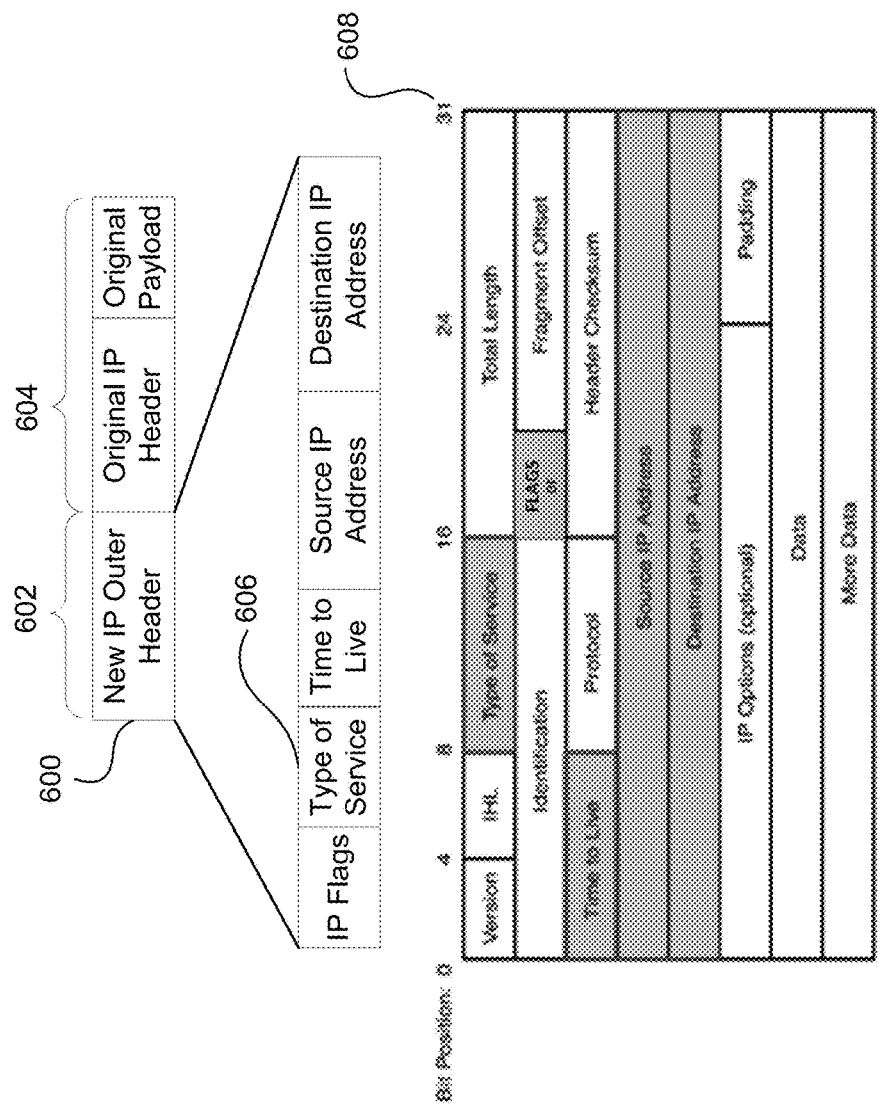
FIG. 6 illustrates an Internet Protocol (IP)-in-IP encapsulated network packet according to certain embodiments.
Figure 7:
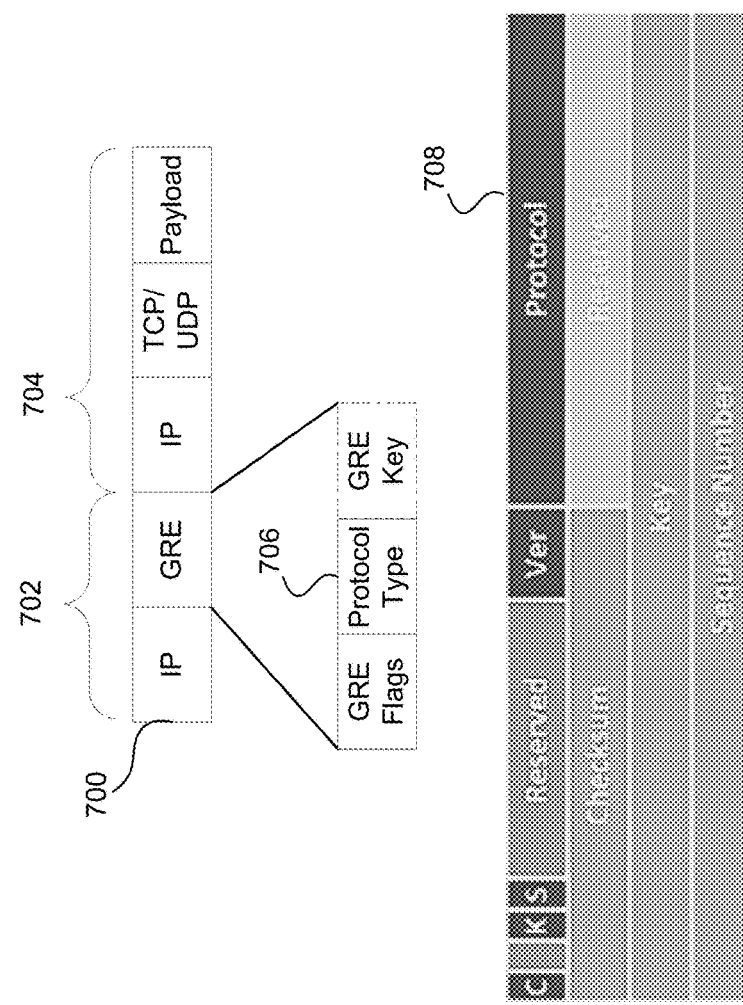
FIG. 7 illustrates a Generic Routing Encapsulation (GRE) encapsulated network packet according to certain embodiments.

FIGS. 6 and 7 illustrate two example encapsulated network packets that can represent network packet 508 or 510, for example. FIG. 6 illustrates encapsulation using an IP-in-IP techniques whereas FIG. 7 illustrates a GRE technique. The illustrated encapsulated packets include headers that can be stored within buffer 504, for example, as disclosed herein. The following are attributes that can be set within headers used to encapsulate network packets using IP-in-IP techniques and/or GRE techniques:

Encapsulation-type: IP-in-IP, GRE (with or without-key). Implementation can be compliant with RFC-2890.

Source IP address (can be IPv4 only)

Destination IP address (can be IPv4 only)

Time to Life (TTL)—if a user does not specify a value then an inner IP header TTL value can be copied to an outer header after decrementing it by 1

Differentiated Services Code Point (DSCP)—if a user does not specify then a value of an inner header can be copied to an outer header Explicit Congestion Notification (ECN)—if a user does not specify, this can default to 01. In addition, it can be changed to 11 (Congestion Encountered) when congestion is experienced.

DF—if a user does not specify then a value of an inner header can be copied to an outer header GRE-KEY—Optional key value FIG. 6 illustrates an example network packet 600 that has been encapsulated using an IP-in-IP techniques. As illustrates, the encapsulated network packet 600 can include an original IP header and an original payload that can form a network packet 604 prior to encapsulation. A new IP outer header 602 can be added to the original network packet 604 to form encapsulated network packet 600. For example, encapsulated network packet 600 can represent network packet 508 or network packet 510. New IP outer header 602 can be stored within buffer 504 as header 514 or 516, for example.

New IP outer header 602 can include several fields 606 which can be assigned by routing logic of a network device (such as border router 502). The fields can correspond to the values previously provided. Header 608 illustrates an example IP header for a network packet. The shaded fields can be modified by routing logic when encapsulating a network packet (such as network packet 600) and correspond to fields 606.

FIG. 7 illustrates an example network packet 700 that has been encapsulated using GRE techniques. As illustrates, the encapsulated network packet 700 can include an original IP header, Transmission Control Protocol (TCP), User Datagram Protocol (UDP), and/or an original payload that can form a network packet 704 prior to encapsulation. A new GRE outer header 702 can be added to the original network packet 704 to form encapsulated network packet 700. For example, encapsulated network packet 700 can represent network packet 508 or network packet 510. New GRE outer header 702 can be stored within buffer 504 as header 514 or 516, for example.

New GRE outer header 702 can include several fields 706 which can be assigned by routing logic of a network device (such as border router 502). The fields can correspond to the values previously provided. Header 708 illustrates an example GRE portion of a header for a network packet. The shaded fields can be modified by routing logic when encapsulating a network packet (such as network packet 700) and correspond to fields 706.

Figure 8:
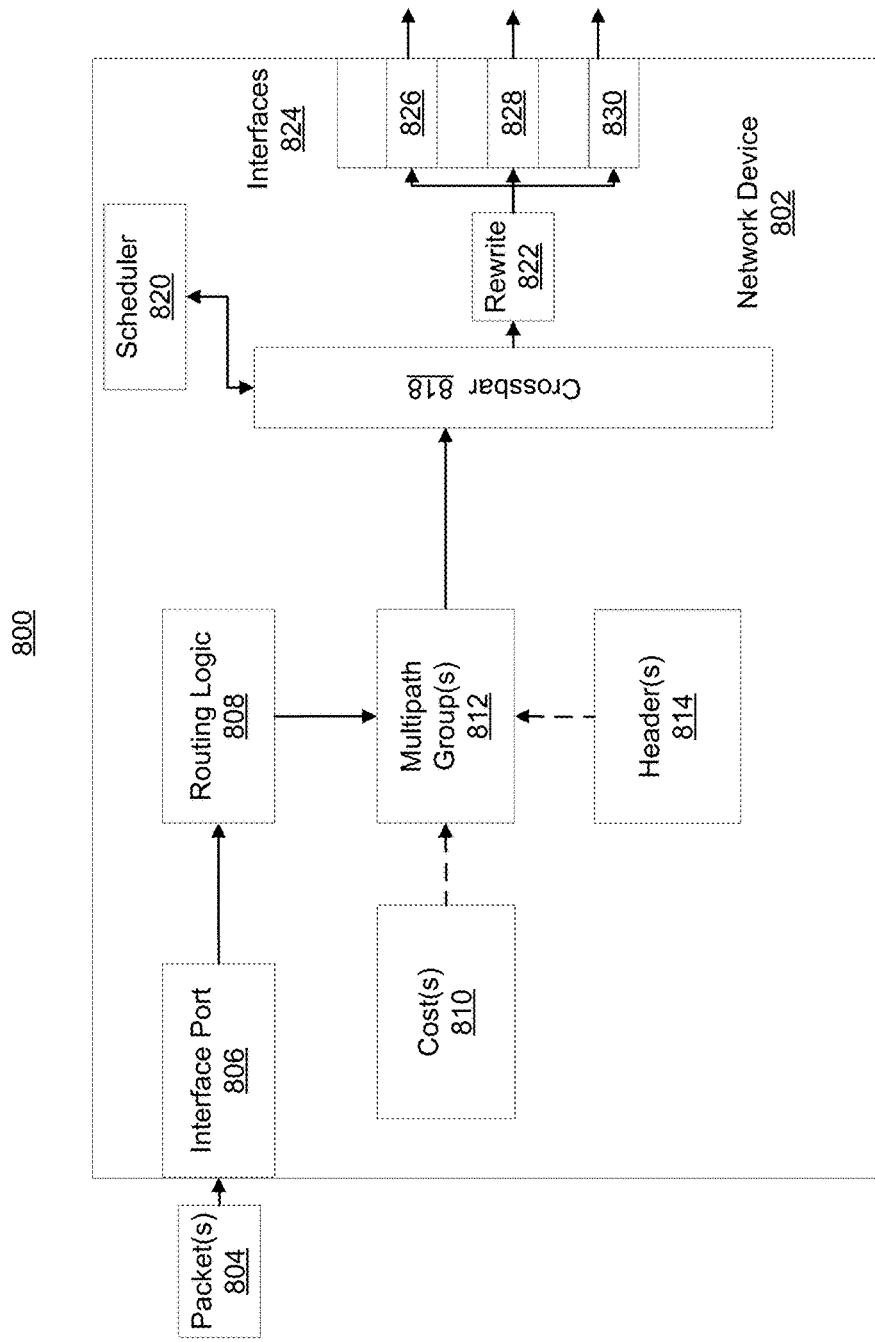
FIG. 8 illustrates a network device according to certain embodiments.

FIG. 8 illustrates a logical representation of network device 802 according to certain embodiments. Network device 802 can receive network packet(s) 804 from network infrastructure 800. Network packet(s) 804 can be received at interface port 806. Interface port 806 can be similar to interface 406 or one of ingress interfaces 214, for example. Network packet(s) 804 can then be processed at routing logic 808 to be directed to multipath group(s) 812. Multipath group(s) 812 can each include functionality of FIG. 4, for example, and can each include a plurality of interfaces (not shown). Each of multipath group(s) 812 can correspond to one of multipath groups 216, 218, or 220, for example. Each of the plurality of interfaces can correspond to an egress interface, such as an interfaces 424, 426, 428, 430, or 434. Each of multipath group(s) can be associated with costs(s) 810 as disclosed herein, which can include, for example, bandwidth information, latency information, and/or monetary cost information to determine the costs(s) 810.

Multipath group(s) 812 can be ranked, as disclosed herein, using cost(s) 810. In certain embodiments, a multipath group can contain one interface. The ranking can be determined based on one or more latencies associated with transportation of a network device to a datacenter, a time to process a network packet at a datacenter, or other. As disclosed herein, routing logic 808 can use hashing or other techniques when selecting one of multipath group(s) 712. Network device 802 can optionally include header(s) 814 which can be stored in a buffer, such as buffer 504. Routing logic 808 can be implemented via a processor executing instructions stored in non-transitory memory, hardware logic gates, or via a combination of the preceding. Crossbar 818 can be similar to crossbar 322. Scheduler 820 can be similar to scheduler 320. Rewrite module 822 can be similar to rewrite module 323. Interfaces 824 (including interfaces 826, 828, and 830) can be similar to interfaces 326.

Figure 9:
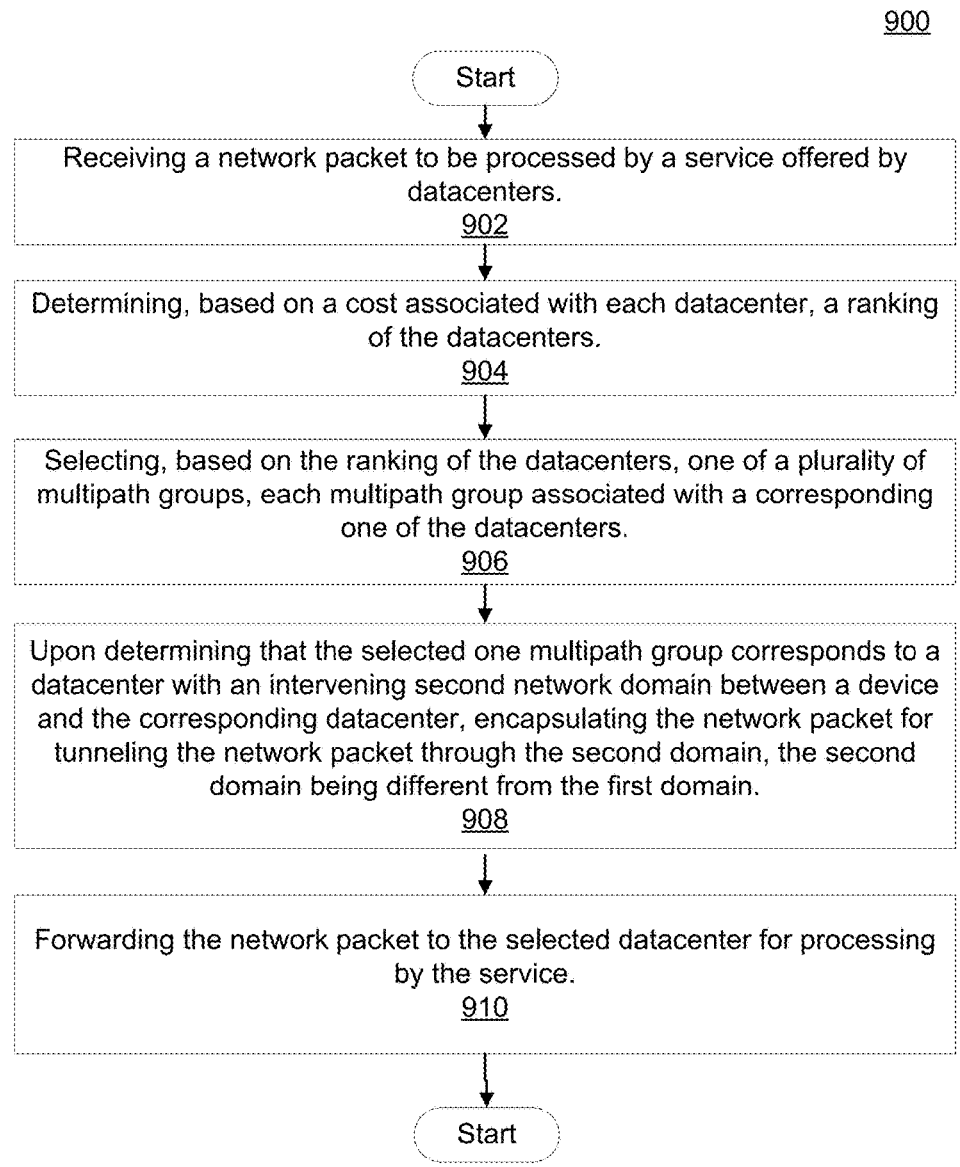
FIG. 9 illustrates a flowchart for implementing techniques of a network device according to certain embodiments.

FIG. 9 illustrated a flowchart 900 for implementing features of the disclosure. Techniques of flowchart 900 can be implemented by border router 204, for example. At 902, a network packet can be received. The network packet can be determined to be processed by a service offered by several datacenters. At 904, a determination can be made, based on a cost to transport a network packet to a respective datacenter, a ranking of the datacenters. As disclosed herein, the cost for the ranking can be based on latency, monetary processing, or bandwidth information regarding processing at each of the datacenters. At 906, a multipath can be selected based on the rankings. For example, routing logic 808 can select one of multipath group(s) 812. Each of multipath group(s) 812 can be associated with a corresponding datacenter, as illustrated in FIG. 2, for example.

At 908, a determination can be made that the selected multipath group corresponds to a remote datacenter (i.e., one in which a domain not shared by the datacenter and a forwarding device is to be traversed by a forwarded network packet). If so, the network packet can be encapsulated to prepare the network packet for tunneling across the domain that is not shared by the datacenter and the forwarding device. At 910, the network packet can be forwarded to a datacenter offering the service for processing by the service.

Figure 10:
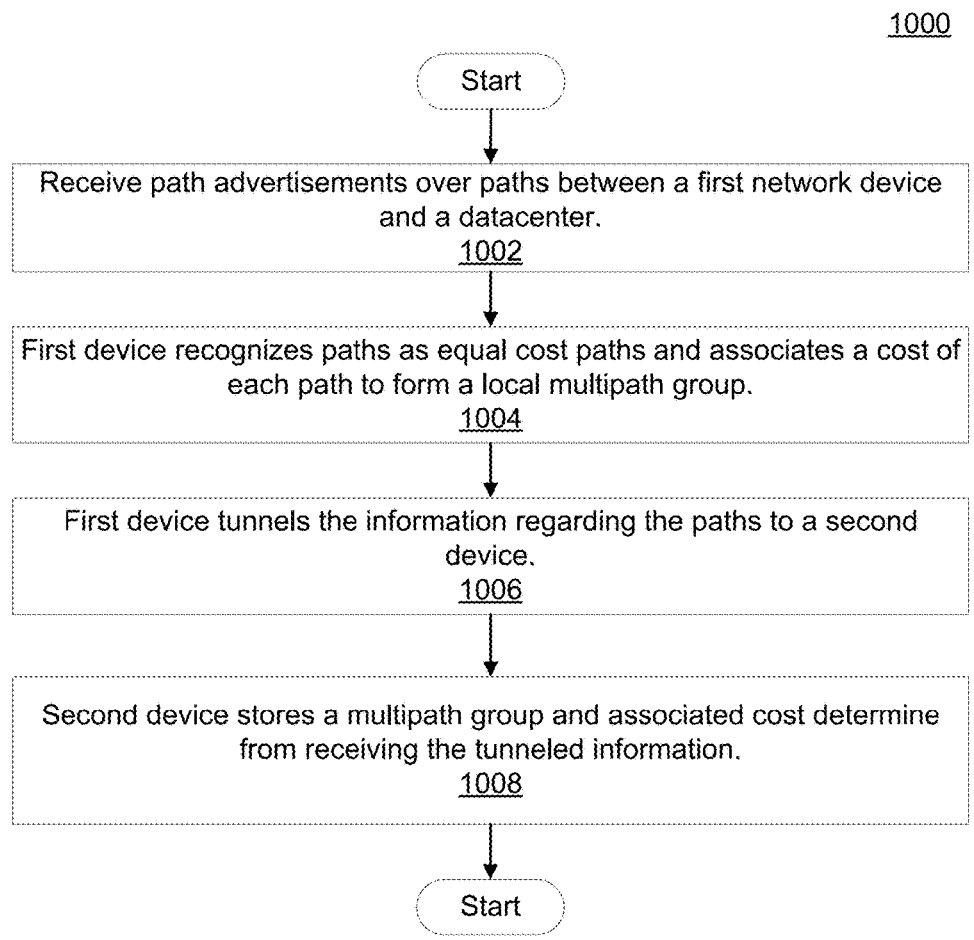
FIG. 10 illustrates a flowchart for implementing techniques of a network device according to certain embodiments.

FIG. 10 illustrates a flowchart 1000 for techniques for recognizing multipath groups associated with datacenters. Techniques of flowchart 1000 can be implemented by border router 207, for example. At 1002, a first device can receive path advertisements over paths between the device and a datacenter. For example, border router 208 can receive advertisements from datacenter 210. The advertisements can be transmitted by spine devices at a datacenter, for example. The advertisements can include, for example, information to determine a monetary cost to process network packets by a service of the datacenter, an amount of available bandwidth on interface(s) to the datacenter, an amount of processing resource(s) available at the datacenter. Using this information, a border router (such as border router 208, for example) can determine a cost associated with a datacenter. For example, if a certain datacenter is currently processing resource constrained due to being overburdened, the cost for that datacenter can be increased. Likewise, bandwidth or monetary costs can cause constraints at a datacenter. At 1004, the first device can recognize the paths as being equal cost paths to the datacenter. The first device can form group the paths into one or more multipath groups, such as equal cost multipath groups At 1006, the device can tunnel the information to a second device (border router 204, for example).

At 1008, the second device can store a multipath group associated with the information (network packets) received from the first device. The multipath group can be a weighted cost multipath group, an equal cost multipath group, or other group. A cost can be associated with the multipath group that can be determined from the cost information provided by the first device. For example, border router 204 can store information regarding multipath group 218 can associated cost information. This information can be used to rank multipath groups, for example. Furthermore, a device can determine, transmit, and/or associate processing cost information with path(s), multipath group(s), and/or datacenter(s) as disclosed herein. In certain embodiments, the first device can be a border router, such as border router 208. In certain embodiments, the first device can be a computer device in a managerial role that coordinates costs of datacenters across multiple border routers (or other network devices).

Figure 11:
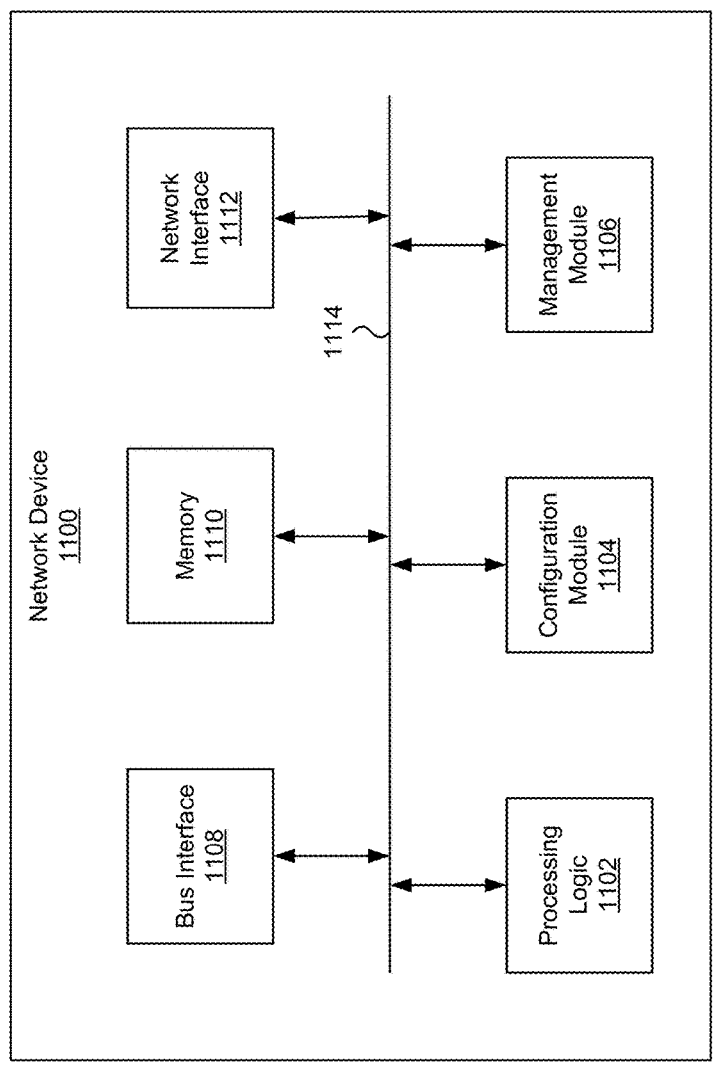
FIG. 11 illustrates an example of a network device, according to certain aspects of the disclosure.

FIG. 11 illustrates an example of a network device 1100. Functionality and/or several components of the network device 1100 may be used without limitation with other embodiments disclosed elsewhere in this disclosure, without limitations. A network device 1100 may facilitate processing of packets and/or forwarding of packets from the network device 1100 to another device. As referred to herein, a "packet" or "network packet" may refer to a variable or fixed unit of data. In some instances, a packet may include a packet header and a packet payload. The packet header may include information associated with the packet, such as the source, destination, quality of service parameters, length, protocol, routing labels, error correction information, etc. In certain implementations, one packet header may indicate information associated with a series of packets, such as a burst transaction. In some implementations, the network device 1100 may be the recipient and/or generator of packets. In some implementations, the network device 1100 may modify the contents of the packet before forwarding the packet to another device. The network device 1100 may be a peripheral device coupled to another computer device, a switch, a router or any other suitable device enabled for receiving and forwarding packets.

In one example, the network device 1100 may include processing logic 1102, a configuration module 1104, a management module 1106, a bus interface module 1108, memory 1110, and a network interface module 1112. These modules may be hardware modules, software modules, or a combination of hardware and software. In certain instances, modules may be interchangeably used with components or engines, without deviating from the scope of the disclosure. The network device 1100 may include additional modules, not illustrated here, such as components discussed with respect to the nodes disclosed in FIG. 12. In some implementations, the network device 1100 may include fewer modules. In some implementations, one or more of the modules may be combined into one module. One or more of the modules may be in communication with each other over a communication channel 1114. The communication channel 1114 may include one or more busses, meshes, matrices, fabrics, a combination of these communication channels, or some other suitable communication channel.

The processing logic 1102 may include application specific integrated circuits (ASICs), field programmable gate arrays (FPGAs), systems-on-chip (SoCs), network processing units (NPUs), processors configured to execute instructions or any other circuitry configured to perform logical arithmetic and floating point operations. Examples of processors that may be included in the processing logic 1102 may include processors developed by ARM®, MIPS®, AMD®, Intel®, Qualcomm®, and the like. In certain implementations, processors may include multiple processing cores, wherein each processing core may be configured to execute instructions independently of the other processing cores. Furthermore, in certain implementations, each processor or processing core may implement multiple processing threads executing instructions on the same processor or processing core, while maintaining logical separation between the multiple processing threads. Such processing threads executing on the processor or processing core may be exposed to software as separate logical processors or processing cores. In some implementations, multiple processors, processing cores or processing threads executing on the same core may share certain resources, such as for example busses, level 1 (L1) caches, and/or level 2 (L2) caches. The instructions executed by the processing logic 1102 may be stored on a computer-readable storage medium, for example, in the form of a computer program. The computer-readable storage medium may be non-transitory. In some cases, the computer-readable medium may be part of the memory 1110.

The memory 1110 may include either volatile or non-volatile, or both volatile and non-volatile types of memory. The memory 1110 may, for example, include random access memory (RAM), read only memory (ROM), Electrically Erasable Programmable Read-Only Memory (EEPROM), flash memory, and/or some other suitable storage media. In some cases, some or all of the memory 1110 may be internal to the network device 1100, while in other cases some or all of the memory may be external to the network device 1100. The memory 1110 may store an operating system comprising executable instructions that, when executed by the processing logic 1102, provides the execution environment for executing instructions providing networking functionality for the network device 1100. The memory may also store and maintain several data structures and routing tables for facilitating the functionality of the network device 1100.

In some implementations, the configuration module 1104 may include one or more configuration registers. Configuration registers may control the operations of the network device 1100. In some implementations, one or more bits in the configuration register can represent certain capabilities of the network device 1100. Configuration registers may be programmed by instructions executing in the processing logic 1102, and/or by an external entity, such as a host device, an operating system executing on a host device, and/or a remote device. The configuration module 1104 may further include hardware and/or software that control the operations of the network device 1100.

In some implementations, the management module 1106 may be configured to manage different components of the network device 1100. In some cases, the management module 1106 may configure one or more bits in one or more configuration registers at power up, to enable or disable certain capabilities of the network device 1100. In certain implementations, the management module 1106 may use processing resources from the processing logic 1102. In other implementations, the management module 1106 may have processing logic similar to the processing logic 1102, but segmented away or implemented on a different power plane than the processing logic 1102.

The bus interface module 1108 may enable communication with external entities, such as a host device and/or other components in a computing system, over an external communication medium. The bus interface module 1108 may include a physical interface for connecting to a cable, socket, port, or other connection to the external communication medium. The bus interface module 1108 may further include hardware and/or software to manage incoming and outgoing transactions. The bus interface module 1108 may implement a local bus protocol, such as Peripheral Component Interconnect (PCI) based protocols, Non-Volatile Memory Express (NVMe), Advanced Host Controller Interface (AHCI), Small Computer System Interface (SCSI), Serial Attached SCSI (SAS), Serial AT Attachment (SATA), Parallel ATA (PATA), some other standard bus protocol, or a proprietary bus protocol. The bus interface module 1108 may include the physical layer for any of these bus protocols, including a connector, power management, and error handling, among other things. In some implementations, the network device 1100 may include multiple bus interface modules for communicating with multiple external entities. These multiple bus interface modules may implement the same local bus protocol, different local bus protocols, or a combination of the same and different bus protocols.

The network interface module 1112 may include hardware and/or software for communicating with a network. This network interface module 1112 may, for example, include physical connectors or physical ports for wired connection to a network, and/or antennas for wireless communication to a network. The network interface module 1112 may further include hardware and/or software configured to implement a network protocol stack. The network interface module 1112 may communicate with the network using a network protocol, such as for example TCP/IP, Infiniband, RoCE, Institute of Electrical and Electronics Engineers (IEEE) 802.11 wireless protocols, User Datagram Protocol (UDP), Asynchronous Transfer Mode (ATM), token ring, frame relay, High Level Data Link Control (HDLC), Fiber Distributed Data Interface (FDDI), and/or Point-to-Point Protocol (PPP), among others. In some implementations, the network device 1100 may include multiple network interface modules, each configured to communicate with a different network. For example, in these implementations, the network device 1100 may include a network interface module for communicating with a wired Ethernet network, a wireless 802.11 network, a cellular network, an Infiniband network, etc.

The various components and modules of the network device 1100, described above, may be implemented as discrete components, as a System on a Chip (SoC), as an ASIC, as an NPU, as an FPGA, or any combination thereof.

In some embodiments, the SoC or other component may be communicatively coupled to another computing system to provide various services such as traffic monitoring, traffic shaping, computing, etc. In some embodiments of the technology, the SoC or other component may include multiple subsystems as disclosed with respect to FIG. 12.

Figure 12:
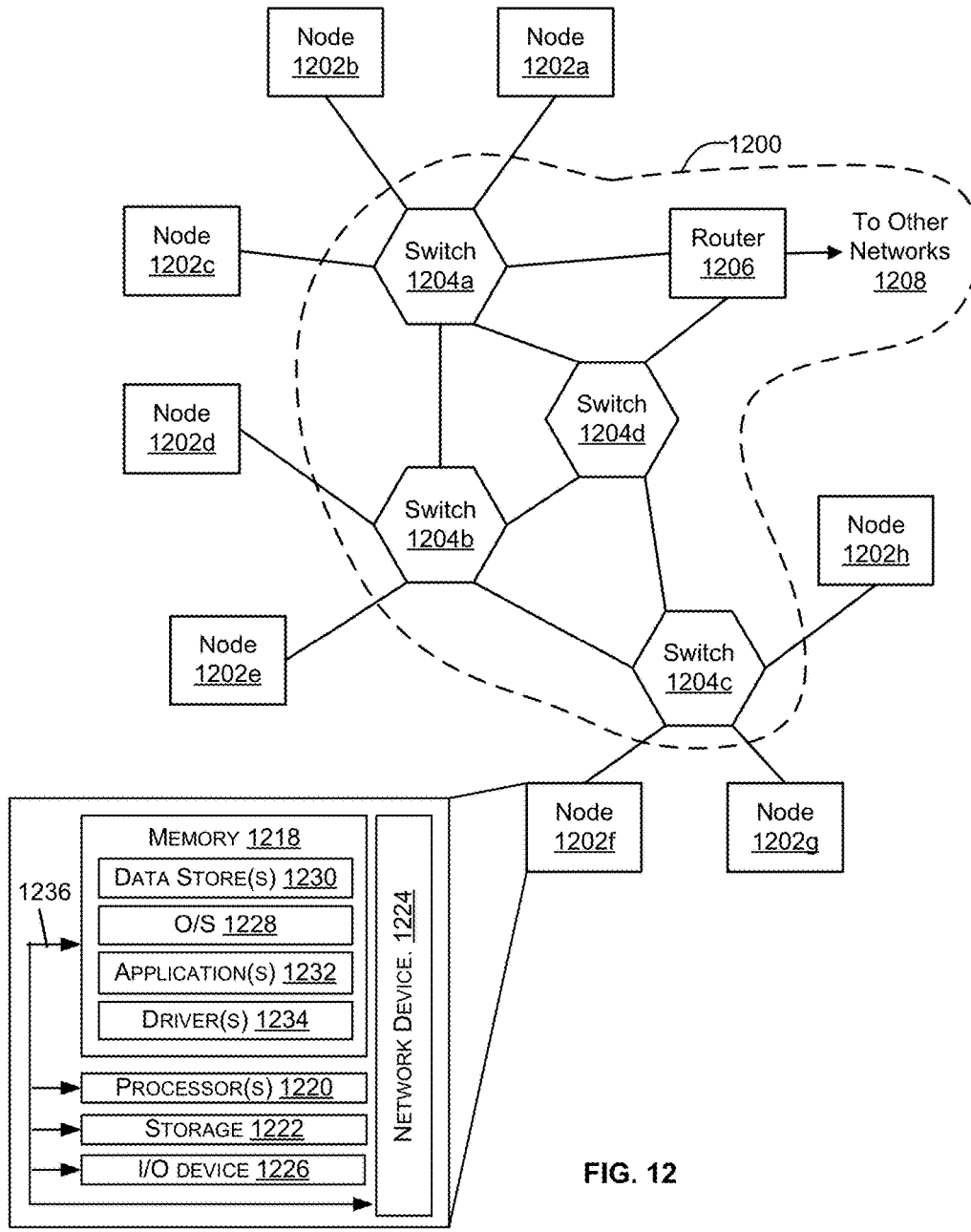
FIG. 12 illustrates an example architecture for features and systems described herein that includes one or more service provider computers and/or a user device connected via one or more networks, according to certain aspects of the disclosure.

FIG. 12 illustrates a network 1200, illustrating various different types of network devices 1100 of FIG. 11, such as nodes comprising the network device, switches and routers. In certain embodiments, the network 1200 may be based on a switched architecture with point-to-point links. As illustrated in FIG. 12, the network 1200 includes a plurality of switches 1204a-1204d, which may be arranged in a network. In some cases, the switches are arranged in a multi-layered network, such as a Clos network. A network device 1100 that filters and forwards packets between local area network (LAN) segments may be referred to as a switch. Switches generally operate at the data link layer (layer 2) and sometimes the network layer (layer 3) of the Open System Interconnect (OSI) Reference Model and may support several packet protocols. Switches 1204a-1204d may be connected to a plurality of nodes 1202a-1202h and provide multiple paths between any two nodes.

The network 1200 may also include one or more network devices 1100 for connection with other networks 1208, such as other subnets, LANs, wide area networks (WANs), or the Internet, and may be referred to as routers 1206. Routers use headers and forwarding tables to determine the best path for forwarding the packets, and use protocols such as internet control message protocol (ICMP) to communicate with each other and configure the best route between any two devices.

In some examples, network(s) 1200 may include any one or a combination of many different types of networks, such as cable networks, the Internet, wireless networks, cellular networks and other private and/or public networks. Interconnected switches 1204a-1204d and router 1206, if present, may be referred to as a switch fabric, a fabric, a network fabric, or simply a network. In the context of a computer network, terms "fabric" and "network" may be used interchangeably herein.

Nodes 1202a-1202h may be any combination of host systems, processor nodes, storage subsystems, and I/O chassis that represent user devices, service provider computers or third party computers.

User devices may include computing devices to access an application 1232 (e.g., a web browser or mobile device application). In some aspects, the application 1232 may be hosted, managed, and/or provided by a computing resources service or service provider. The application 1232 may allow the user(s) to interact with the service provider computer(s) to, for example, access web content (e.g., web pages, music, video, etc.). The user device(s) may be a computing device such as for example a mobile phone, a smart phone, a personal digital assistant (PDA), a laptop computer, a netbook computer, a desktop computer, a thin-client device, a tablet computer, an electronic book (e-book) reader, a gaming console, etc. In some examples, the user device(s) may be in communication with the service provider computer(s) via the other network(s) 1208. Additionally, the user device(s) may be part of the distributed system managed by, controlled by, or otherwise part of the service provider computer(s) (e.g., a console device integrated with the service provider computers).

The node(s) of FIG. 12 may also represent one or more service provider computers. One or more service provider computers may provide a native application that is configured to run on the user devices, which user(s) may interact with. The service provider computer(s) may, in some examples, provide computing resources such as, but not limited to, client entities, low latency data storage, durable data storage, data access, management, virtualization, cloud-based software solutions, electronic content performance management, and so on. The service provider computer(s) may also be operable to provide web hosting, databasing, computer application development and/or implementation platforms, combinations of the foregoing or the like to the user(s). In some embodiments, the service provider computer(s) may be provided as one or more virtual machines implemented in a hosted computing environment. The hosted computing environment may include one or more rapidly provisioned and released computing resources. These computing resources may include computing, networking and/or storage devices. A hosted computing environment may also be referred to as a cloud computing environment. The service provider computer(s) may include one or more servers, perhaps arranged in a cluster, as a server farm, or as individual servers not associated with one another and may host the application 1232 and/or cloud-based software services. These servers may be configured as part of an integrated, distributed computing environment. In some aspects, the service provider computer(s) may, additionally or alternatively, include computing devices such as for example a mobile phone, a smart phone, a personal digital assistant (PDA), a laptop computer, a desktop computer, a netbook computer, a server computer, a thin-client device, a tablet computer, a gaming console, etc. In some instances, the service provider computer(s), may communicate with one or more third party computers.

In one example configuration, the node(s) 1202a-1202h may include at least one memory 1218 and one or more processing units (or processor(s) 1220). The processor(s) 1220 may be implemented in hardware, computer-executable instructions, firmware, or combinations thereof. Computer-executable instruction or firmware implementations of the processor(s) 1220 may include computer-executable or machine-executable instructions written in any suitable programming language to perform the various functions described.

In some instances, the hardware processor(s) 1220 may be a single core processor or a multi-core processor. A multi-core processor may include multiple processing units within the same processor. In some embodiments, the multi-core processors may share certain resources, such as buses and second or third level caches. In some instances, each core in a single or multi-core processor may also include multiple executing logical processors (or executing threads). In such a core (e.g., those with multiple logical processors), several stages of the execution pipeline and also lower level caches may also be shared.

The memory 1218 may store program instructions that are loadable and executable on the processor(s) 1220, as well as data generated during the execution of these programs. Depending on the configuration and type of the node(s) 1202a-1202h, the memory 1218 may be volatile (such as RAM) and/or non-volatile (such as ROM, flash memory, etc.). The memory 1218 may include an operating system 1228, one or more data stores 1230, one or more application programs 1232, one or more drivers 1234, and/or services for implementing the features disclosed herein.

The operating system 1228 may support nodes 1202a-1202h basic functions, such as scheduling tasks, executing applications, and/or controller peripheral devices. In some implementations, a service provider computer may host one or more virtual machines. In these implementations, each virtual machine may be configured to execute its own operating system. Examples of operating systems include Unix, Linux, Windows, Mac OS, iOS, Android, and the like. The operating system 1228 may also be a proprietary operating system.

The data stores 1230 may include permanent or transitory data used and/or operated on by the operating system 1228, application programs 1232, or drivers 1234. Examples of such data include web pages, video data, audio data, images, user data, and so on. The information in the data stores 1230 may, in some implementations, be provided over the network(s) 1208 to user devices 1204. In some cases, the data stores 1230 may additionally or alternatively include stored application programs and/or drivers. Alternatively or additionally, the data stores 1230 may store standard and/or proprietary software libraries, and/or standard and/or proprietary application user interface (API) libraries. Information stored in the data stores 1230 may be machine-readable object code, source code, interpreted code, or intermediate code.

The drivers 1234 include programs that may provide communication between components in a node. For example, some drivers 1234 may provide communication between the operating system 1228 and additional storage 1222, network device 1224, and/or I/O device 1226. Alternatively or additionally, some drivers 1234 may provide communication between application programs 1232 and the operating system 1228, and/or application programs 1232 and peripheral devices accessible to the service provider computer. In many cases, the drivers 1234 may include drivers that provide well-understood functionality (e.g., printer drivers, display drivers, hard disk drivers, Solid State Device drivers). In other cases, the drivers 1234 may provide proprietary or specialized functionality.

The service provider computer(s) or servers may also include additional storage 1222, which may include removable storage and/or non-removable storage. The additional storage 1222 may include magnetic storage, optical disks, solid state disks, flash memory, and/or tape storage. The additional storage 1222 may be housed in the same chassis as the node(s) 1202a-1202h or may be in an external enclosure. The memory 1218 and/or additional storage 1222 and their associated computer-readable media may provide non-volatile storage of computer-readable instructions, data structures, program modules, and other data for the computing devices. In some implementations, the memory 1218 may include multiple different types of memory, such as SRAM, DRAM, or ROM.

The memory 1218 and the additional storage 1222, both removable and non-removable, are examples of computer-readable storage media. For example, computer-readable storage media may include volatile or non-volatile, removable or non-removable media implemented in a method or technology for storage of information, the information including, for example, computer-readable instructions, data structures, program modules, or other data. The memory 1218 and the additional storage 1222 are examples of computer storage media. Additional types of computer storage media that may be present in the node(s) 1202a-1202h may include, but are not limited to, PRAM, SRAM, DRAM, RAM, ROM, EEPROM, flash memory or other memory technology, CD-ROM, DVD or other optical storage, magnetic cassettes, magnetic tape, magnetic disk storage or other magnetic storage devices, solid state drives, or some other medium which can be used to store the desired information and which can be accessed by the node(s) 1202a-1202h.

Computer-readable media also includes combinations of any of the above media types, including multiple units of one media type.

Alternatively or additionally, computer-readable communication media may include computer-readable instructions, program modules or other data transmitted within a data signal, such as a carrier wave or other transmission. However, as used herein, computer-readable storage media does not include computer-readable communication media.

The node(s) 1202a-1202h may also include I/O device(s) 1226, such as a keyboard, a mouse, a pen, a voice input device, a touch input device, a display, speakers, a printer, and the like. The node(s) 1202a-1202h may also include one or more communication channels 1236. A communication channel 1236 may provide a medium over which the various components of the node(s) 1202a-1202h can communicate. The communication channel or channels 1236 may take the form of a bus, a ring, a switching fabric, or a network.

The node(s) 1202a-1202h may also contain network device(s) 1224 that allow the node(s) 1202a-1202h to communicate with a stored database, another computing device or server, user terminals and/or other devices on the network (s) 1200. The network device(s) 1224 of FIG. 12 may include similar components discussed with reference to the network device 1100 of FIG. 11.

In some implementations, the network device 1224 is a peripheral device, such as a PCI-based device. In these implementations, the network device 1224 includes a PCI interface for communicating with a host device. The term "PCI" or "PCI-based" may be used to describe any protocol in the PCI family of bus protocols, including the original PCI standard, PCI-X, Accelerated Graphics Port (AGP), and PCI-Express (PCIe) or any other improvement or derived protocols that are based on the PCI protocols discussed herein. The PCI-based protocols are standard bus protocols for connecting devices, such as a local peripheral device to a host device. A standard bus protocol is a data transfer protocol for which a specification has been defined and adopted by various manufacturers. Manufacturers ensure that compliant devices are compatible with computing systems implementing the bus protocol, and vice versa. As used herein, PCI-based devices also include devices that communicate using Non-Volatile Memory Express (NVMe). NVMe is a device interface specification for accessing non-volatile storage media attached to a computing system using PCIe. For example, the bus interface module 1108 may implement NVMe, and the network device 1224 may be connected to a computing system using a PCIe interface.

A PCI-based device may include one or more functions. A "function" describes operations that may be provided by the network device 1224. Examples of functions include mass storage controllers, network controllers, display controllers, memory controllers, serial bus controllers, wireless controllers, and encryption and decryption controllers, among others. In some cases, a PCI-based device may include more than one function. For example, a PCI-based device may provide a mass storage controller and a network adapter. As another example, a PCI-based device may provide two storage controllers, to control two different storage resources. In some implementations, a PCI-based device may have up to eight functions.

In some implementations, the network device 1224 may include single-root I/O virtualization (SR-IOV). SR-IOV is an extended capability that may be included in a PCI-based device. SR-IOV allows a physical resource (e.g., a single network interface controller) to appear as multiple resources (e.g., sixty-four network interface controllers). Thus, a PCI-based device providing a certain functionality (e.g., a network interface controller) may appear to a device making use of the PCI-based device to be multiple devices providing the same functionality. The functions of an SR-IOV-capable storage adapter device may be classified as physical functions (PFs) or virtual functions (VFs). Physical functions are fully featured functions of the device that can be discovered, managed, and manipulated. Physical functions have configuration resources that can be used to configure or control the storage adapter device. Physical functions include the same configuration address space and memory address space that a non-virtualized device would have. A physical function may have a number of virtual functions associated with it. Virtual functions are similar to physical functions, but are light-weight functions that may generally lack configuration resources, and are generally controlled by the configuration of their underlying physical functions. Each of the physical functions and/or virtual functions may be assigned to a respective thread of execution (such as for example, a virtual machine) running on a host device.

The modules described herein may be software modules, hardware modules or a suitable combination thereof. If the modules are software modules, the modules can be embodied on a non-transitory computer readable medium and processed by a processor in any of the computer systems described herein. It should be noted that the described processes and architectures can be performed either in real-time or in an asynchronous mode prior to any user interaction. The modules may be configured in the manner suggested in FIG. 11, FIG. 12, and/or functions described herein can be provided by one or more modules that exist as separate modules and/or module functions described herein can be spread over multiple modules.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Various embodiments of this disclosure are described herein, including the best mode known to the inventors for carrying out the disclosure. Variations of those embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

What is claimed is:

1. A device, comprising:
   interfaces, each configured to output network packets;
   a memory storing:
      multipath groups each associated with some of the interfaces, wherein each multipath group is also associated with a corresponding datacenter, each datacenter being in a first domain shared with the device; and
      routing logic configured to:
         determine, for each of the multipath groups, a cost to process the network packet at the datacenter corresponding to the multipath group;
         rank the multipath groups according to the cost;
         receive, via one of the interfaces, a network packet;
         determine that the network packet is to be processed by a service offered on each of the datacenters, the service indicating that the network packet can be processed interchangeably at any of the datacenters;
         select, based on a result of the ranking of the multipath groups, one of the multipath groups for forwarding of the network packet to the datacenter of the selected multipath group;
         upon determining that there is an intervening second domain between the device and a datacenter of the selected multipath group, encapsulate the network packet for tunneling the network packet through the second domain, the second domain being different from the first domain; and
         forward the network packet via the selected multipath group.

2. The device of claim 1, wherein the memory further stores headers, each corresponding to one of the datacenters; and wherein the encapsulating includes selecting a header from the stored headers that corresponds to the datacenter of the selected multipath group.

3. The device of claim 1, wherein the cost further includes a latency, a bandwidth allocation, or a monetary cost associated with each of the datacenters.

4. The device of claim 1, wherein the routing logic is implemented by a processor, application specific integrated circuit (ASIC), digital signal processor (DSP), system on a chip (SoC), field programmable gate array (FPGA), or programmable logic device (PLD).

5. A device, comprising:
   interfaces, each configured to output network packets;
   a memory storing:
      multipath groups each associated with some of the interfaces, wherein each multipath group is also associated with a corresponding datacenter, each datacenter being in a first domain shared with the device; and
      routing logic configured to:
         receive a network packet to be processed by a datacenter of the datacenters, wherein the network packet can be processed interchangeably at the each datacenter of the datacenters;
         select one of the multipath groups for outputting of the network packet to the datacenter corresponding to the selected multipath group for processing, the selecting based upon a result of ranking of the multipath groups based on a respective cost to process the network packet at the corresponding datacenter of each of the multipath groups; and
         upon determining that there is an intervening second domain between the device and a corresponding datacenter of the selected multipath group, encapsulate the network packet for tunneling the network packet through the second domain, the second domain being different from the first domain.

6. The device of claim 5, wherein the cost of each multipath group further includes a latency time for transporting the network packet to each of the datacenters.

7. The device of claim 5, wherein the respective cost of each multipath group includes a total bandwidth available on interfaces of each of the multipath groups to each of the datacenters.

8. The device of claim 7, wherein cost of each multipath group further includes an available bandwidth of the total bandwidth available for each of the multipath groups to each of the datacenters.

9. The device of claim 5, wherein the cost of each multipath group includes a monetary cost to process the network packet at each of the datacenters.

10. The device of claim 5, wherein in the ranking is also based on a cost to transport the network packet to the datacenter corresponding to each of the multipath groups.

11. The device of claim 10, wherein the selecting the one of the multipath groups includes selecting a multipath group having a highest rank, the highest rank indicating a lowest corresponding cost.

12. The device of claim 10, wherein the selecting the one of the multipath groups includes load balancing the forwarding of the network packets across the multipath groups based on the cost of each multipath group, wherein the load balancing distributes the network packets for processing by the datacenters corresponding to the multipath groups.

13. The device of claim 10, wherein each of the ranked multipath groups corresponds to a portion of a hash range, wherein the selecting the one of the multipath groups includes generating a hash value and determining which portion of the hash range the hash value falls within; and
wherein the routing logic is further configured to, upon determining that a datacenter is unavailable, reallocate the portion of the hash range corresponding to the unavailable datacenter to the multipath groups corresponding to available datacenters.

14. The device of claim 5, wherein the routing logic is further configured to, upon determining that the selected multipath group corresponds to a datacenter without an intervening network domain between the device and the datacenter, forward the network packet via the selected multipath group for processing without encapsulating the network packet for tunneling.

15. The device of claim 5, wherein the encapsulating includes selecting a header from a plurality of headers, each of the plurality of headers corresponding to a respective datacenter to tunnel the network packet to the respective datacenter.

16. A method, comprising:
receiving, by a device, a network packet to be processed by a service offered by datacenters such that the network packet can be processed at any of the datacenters, wherein each datacenter shares a first domain with the device;
determining, based on a cost associated with each datacenter, a ranking of the datacenters;
selecting, based on the ranking of the datacenters, one of a plurality of multipath groups, each multipath group associated with a corresponding one of the datacenters;
upon determining that there is an intervening second domain between the device and the corresponding datacenter of the selected multipath group, encapsulating the network packet for tunneling the network packet through the second domain, the second domain being different from the first domain; and
forwarding the network packet to the datacenter corresponding the selected one multipath group for processing by the service.

17. The method of claim 16, further comprising selecting a header from a plurality of headers, the selected header for the encapsulating the network packet for tunneling.

18. The method of claim 16, wherein the ranking is further based on at least one of a latency, a processing time, a bandwidth, or a monetary cost associated with each of the datacenters.

19. The method of claim 18, wherein the selecting the one multipath group includes selecting the one multipath group having the lowest cost, the cost including the latency and the processing time.

20. The method of claim 18, wherein the selecting the one multipath group includes selecting the one multipath group to load balance resources of the datacenters.

21. The device of claim 5, wherein each multipath group includes a plurality of interfaces of the interfaces configured to forward at least some of the network packets to the corresponding datacenter.

22. The device of claim 5, wherein the tunneling the network packet through the second domain comprises transmitting the network packet through the second domain such that the second domain is unaware that the transmission is for the first domain.

23. The device of claim 10, wherein the routing logic is configured to:
forward a first portion of the network packets to interfaces of the highest ranked multipath group; and
forward a second portion of the network packets to interfaces of the second highest ranked multipath group, the second portion being smaller than the first portion.

24. The device of claim 23, wherein the routing logic is configured to:
tunnel the first portion of the network packets through the second domain to a corresponding datacenter of the highest ranked multipath group; and
tunnel the second portion of the network packets through a third domain to a corresponding datacenter of the second highest ranked multipath group, the third domain being different from the first domain.

25. The device of claim 1, wherein the ranking is also based on a cost to transport the network packet to the datacenter corresponding to each of the multipath group.

26. The device of claim 25, wherein the routing logic is configured to:
forward a first portion of the network packets to interfaces of the highest ranked multipath group; and
forward a second portion of the network packets to interfaces of the second highest ranked multipath group, the second portion being smaller than the first portion.

27. The device of claim 26, wherein the routing logic is configured to:
tunnel the first portion of the network packets through the second domain to a corresponding datacenter of the highest ranked multipath group; and
tunnel the second portion of the network packets through a third domain to a corresponding datacenter of the second highest ranked multipath group, the third domain being different from the first domain.

28. The method of claim 16, wherein the ranking is also based on a cost to transport the network packet to the datacenter corresponding to each of the multipath group.

29. The method of claim 28, further comprising:
forwarding a first portion of the network packets to interfaces of the highest ranked multipath group; and
forwarding a second portion of the network packets to interfaces of the second highest ranked multipath group, the second portion being smaller than the first portion.

30. The method of claim 29, further comprising:
tunneling the first portion of the network packets through the second domain to a corresponding datacenter of the highest ranked multipath group; and
1. tunneling the second portion of the network packets through a third domain to a corresponding datacenter of the second highest ranked multipath group, the third domain being different from the first domain.

* * * * *